US011162000B2

(12) United States Patent
Wynne et al.

(10) Patent No.: US 11,162,000 B2
(45) Date of Patent: *Nov. 2, 2021

(54) ICE RELEASE COATINGS

(71) Applicant: VIRGINIA COMMONWEALTH UNIVERSITY, Richmond, VA (US)

(72) Inventors: Kenneth J. Wynne, Midlothian, VA (US); Wei Zhang, Midlothian, VA (US)

(73) Assignee: VIRGINIA COMMONWEALTH UNIVERSITY, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/188,192

(22) Filed: Nov. 12, 2018

(65) Prior Publication Data

US 2019/0315999 A1 Oct. 17, 2019

Related U.S. Application Data

(63) Continuation of application No. 15/025,888, filed as application No. PCT/US2014/058499 on Sep. 30, 2014, now Pat. No. 10,221,333.

(60) Provisional application No. 61/884,986, filed on Sep. 30, 2013.

(51) Int. Cl.
| | | |
|---|---|---|
| *C09D 171/02* | (2006.01) | |
| *C09D 183/14* | (2006.01) | |
| *C08G 65/331* | (2006.01) | |
| *C08G 77/38* | (2006.01) | |
| *C08L 71/02* | (2006.01) | |
| *C08L 75/04* | (2006.01) | |
| *B32B 27/40* | (2006.01) | |
| *C08G 77/54* | (2006.01) | |
| *C08G 77/388* | (2006.01) | |
| *C08K 5/5465* | (2006.01) | |
| *C09K 3/18* | (2006.01) | |
| *C08G 65/336* | (2006.01) | |

(52) U.S. Cl.
CPC ......... *C09D 171/02* (2013.01); *C08G 65/336* (2013.01); *C08G 77/388* (2013.01); *C08G 77/54* (2013.01); *C08K 5/5465* (2013.01); *C08L 71/02* (2013.01); *C08L 75/04* (2013.01); *C09D 183/14* (2013.01); *C09K 3/18* (2013.01)

(58) Field of Classification Search
None
See application file for complete search history.

(56) References Cited

U.S. PATENT DOCUMENTS

| | | | | |
|---|---|---|---|---|
| 4,572,872 A | * | 2/1986 | Yamazaki | B60J 1/17 427/385.5 |
| 4,902,767 A | * | 2/1990 | Roitman | C08G 18/10 528/28 |
| 6,534,568 B1 | * | 3/2003 | Katz | C08G 18/289 523/212 |
| 8,501,903 B2 | * | 8/2013 | Zander | C08G 18/10 528/403 |
| 8,907,027 B2 | * | 12/2014 | Stanjek | C08G 18/4825 525/474 |
| 10,221,333 B2 | * | 3/2019 | Wynne | C09D 183/14 |
| 2011/0071254 A1 | * | 3/2011 | Bachon | C08G 18/4854 524/588 |
| 2012/0107626 A1 | * | 5/2012 | Schindler | C08G 65/336 428/447 |

FOREIGN PATENT DOCUMENTS

| | | | | |
|---|---|---|---|---|
| JP | 2004225009 A | * | 8/2004 | |
| WO | WO2013026654 A1 | * | 2/2013 | |

* cited by examiner

*Primary Examiner* — Tae H Yoon
(74) *Attorney, Agent, or Firm* — Law Office of John K. Pike, PLLC

(57) ABSTRACT

A compound is provided, having the formula (I), wherein $R_S$ is a soft block polymer; wherein each T is independently a urethane or urea linkage; see formulae (A) and (B); wherein each $R_D$ is independently —$CH_3$, —$CH_2CH_3$, —$CH_2CH_2CH_3$, or —$CH_2CH_2CH_2CH_3$; wherein each $R'_D$ is independently —$CH_3$, —$CH_2CH_3$, —$CH_2CH_2CH_3$, —$CH_2CH_2CH_2CH_3$, or —$OR_D$; and wherein each p is independently 1, 2, or 3. Compositions containing the compound, and methods of making and using the compound are provided.

18 Claims, 14 Drawing Sheets

Coating on aluminum/glass substrate

ICE RELEASE COATINGS

REFERENCE TO AN EARLIER APPLICATION

This application is a continuation application of U.S. application Ser. No. 15/025,888, filed Sep. 30, 2014, as a 371 National Stage Entry of PCT International Application No. PCT/US14/58499, now U.S. Pat. No. 10,221,333, issued Mar. 5, 2019, which claims priority to U.S. Provisional Application No. 61/884,986, filed Sep. 30, 2013, the entire contents of each of which are hereby incorporated by reference.

GOVERNMENT LICENSE RIGHTS

This invention was made with government support under grant number(s) DMR0802452 and DMR1206259 awarded by the National Science Foundation (NSF) and N00014-09-1-0780 awarded by NAVY/ONR. The government has certain rights in the invention.

FIELD OF THE APPLICATION

The present application relates to polymer coatings and coating compositions, methods of making, and their use.

BACKGROUND

Ice accumulation is a serious problem for many industries including aerospace, marine, wind energy, power utilities, refrigeration, and commercial fishing.
Telecommunications towers are affected in cold environments when icing on exposed structures causes damage. Icing leads to material loss, reduced performance, and interference with normal operations. Icing often leads to injuries and sometimes to deadly accidents.

Because of the broad range of effected sectors, there is no universal solution to ice accumulation. Use of the term "ice-phobic", which suggests some surfaces prevent ice formation, is incorrect as no coating or surface prevents ice formation under all icing conditions. Depending on the application, the desired outcome is usually the prevention of ice accumulation through easy removal at an early stage of accretion by "natural" forces including wind, vibration, or centrifugal force. The extent of accumulation that can be tolerated varies greatly as does the degree to which ice can be removed from a surface by "natural means". For throwing off ice by centrifugal force, a coating technology must take into account that the surface of a wind turbine blade close to the rotor moves much more slowly than the tip of the blade. Power lines are fixed, but may undergo substantial flexing due to wind and vibration.

Perhaps the most demanding applications requirements are those posed by the aerospace industry. These applications have strict requirements for maximum tolerable mass and for uncompromised reliability. It is well known that airfoil icing disrupts airflow, reduces lift, and jeopardizes control. Currently, the aviation industry broadly employs active anti-icing (e.g., heating) to mitigate icing related problems.

Ice accumulation on airplane wings must be removed before takeoff, typically with ethylene or propylene glycol-based fluids or foams. EPA estimated more than 25 million gallons of de-icing agents are annually applied at commercial US airports. De-icing agents are normally not recycled and are discharged directly into waste water systems. Such discharge has caused increased biological oxygen demand and total organic content in groundwater. For the aviation industry, de-icing agents are the method of choice despite the environmental concerns. As more environmentally benign de-icing methods are developed and environmental regulations become stricter, alternatives such as highly efficient ice release coatings will be sought.

Power transmission and telecommunications often encounter problems from icing. In these instances, billion dollar losses can be suffered in major winter storms. In December, 2008, an ice-storm crippled the eastern New England states. The storm impacted an area of 3,250 square miles of the National Grid power company's service area in Massachusetts, N.H. and Rhode Island. National Grid had to repair or replace more than 416,000 feet of distribution wire.

The industrial freezer industry has icing problems that are not generally known or appreciated. In commercial freezer facilities, processed foods are transferred into "blast freezer" rooms where liquid dripping from the food forms ice on the floors. Another problem for industrial freezers is ice development around the entrance doors to freezer sections. For this application, manufacturers of refrigeration units seek ice-release coatings that bond well to substrates such as high impact polystyrene. Other problems for which ice-release coatings offer promise include amelioration of blockage of drains and "icing-up" of air conditioners.

From the above summary, market needs for products from which ice can be removed easily vary widely in terms of technical requirements and challenges.

Currently used active methods for de-icing include de-icing fluids for aircraft discussed above and resistive heating where ample power is available such as wind turbines, automobile windshields, and refrigeration units. Resistive heating is costly to implement and reduces net power generated from wind farms. Passive de-icing methods such as icephobic and ice-release coatings are based on silicones or fluoropolymers. Silicones are known for their weak mechanical properties and high cost. Fluorocarbon polymers, if used in the neat form, are even more expensive than silicone materials.

It is logical to think that ice cannot form if water does not wet the surface. Therefore, superhydrophobic surfaces have been investigated to achieve icephobic surfaces. In most cases, such surfaces require careful microstructural fabrication or electrospinning to generate specific complex microstructures for samples that have dimensions of a few square centimeters. Such complex processes are not applicable for large surface areas, at least at present.

A common but mistakenly held notion is that polytetrafluoroethylene (PTFE) or "Teflon" should be good for ice release. Teflon and similar semicrystalline fluoropolymers are processable at high temperatures to generate "non-stick" surfaces for cookware and the like. However, such high temperature processes are not applicable for large area coating technologies. Secondly, polymers made of long fluorocarbon chains (>C6) are degradable to perfluorooctanoic acid (PFOA) that persists indefinitely in the environment. PFOA is bioaccumulative and is a proven carcinogen. Again, current technologies are inadequate.

BRIEF SUMMARY OF THE SEVERAL EMBODIMENTS

Figure 1:
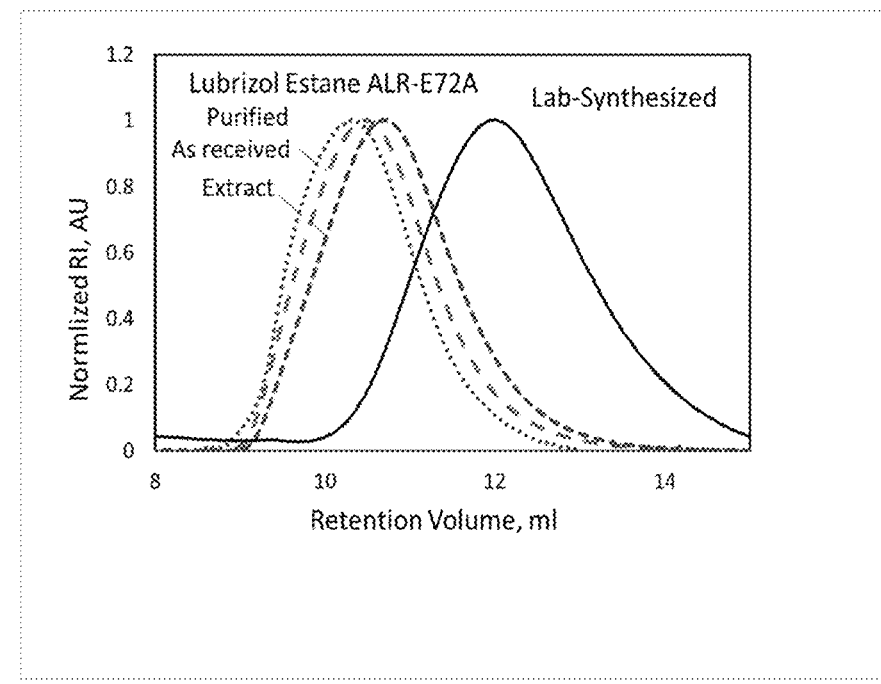
FIG. 1 presents GPC results for homemade TPU, commercial TPU and purified commercial TPUs.

One embodiment provides a compound having the formula (I):

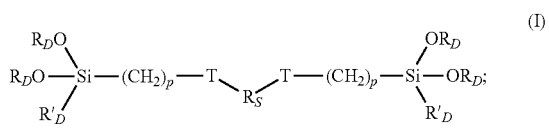

wherein $R_S$ is a soft block polymer,
wherein each T is independently a urethane or urea linkage;

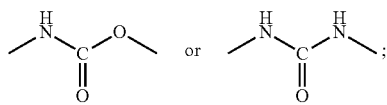

wherein each $R_D$ is independently —$CH_3$, —$CH_2CH_3$, —$CH_2CH_2CH_3$, or —$CH_2CH_2CH_2CH_3$;
wherein each $R'_D$ is independently —$CH_3$, —$CH_2CH_3$, —$CH_2CH_2CH_3$, —$CH_2CH_2CH_2CH_3$, or —$OR_D$; and
wherein each p is independently 1, 2, or 3.

In one embodiment, the soft block polymer $R_S$ is not a polyoxetane.

In one embodiment, the soft block polymer $R_S$ is a polyether, polydiene, polyolefin, polysiloxane, polyester, or combination thereof. In one embodiment, soft block polymer is derived from a diol, diamine endcapped polyether, polydiene, polyolefin, polysiloxane, polyester, or combination thereof.

In one embodiment, the soft block polymer $R_S$ is a linear homopolymer or copolymer. In one embodiment, the soft block polymer $R_S$ is a homopolymer.

In one embodiment, the soft block polymer $R_S$ has a molecular weight, $M_w$, of 200-10,000 Da. This range includes all values and subranges therebetween, including 200, 225, 250, 300, 400, 450, 500, 600, 700, 800, 900, 1000, 2000, 2500, 5000, 7500, and 10000.

In one embodiment, the T is independently a urethane linkage or urea linkage.

In one embodiment, each $R_D$ is independently —$CH_3$ or —$CH_2CH_3$.

In one embodiment, each $R'_D$ is independently —$CH_3$, —$OCH_3$, or —$OCH_2CH_3$.

In one embodiment, each $R_D$ is —$CH_2CH_3$, and each $R'_D$ is —$OCH_2CH_3$.

In one embodiment, two or more different compounds having formula (I) may be present in a composition, wherein a first soft block polymer $R_S$ in one compound having formula (I) has a molecular weight, $M_w$, of 200-1,000 Da, and a second soft block polymer $R_S$ in a different compound having formula (I) has a molecular weight, $M_w$, of 1,500-3,000 Da. These ranges include all values and subranges therebetween, including 200, 225, 250, 300, 350, 400, 450, 500, 550, 600, 650, 700, 750, 800, 850, 900, 950, and 1000 Da; and 1,500, 1550, 1600, 1650, 1700, 1750, 1800, 1850, 1900, 1950, 2000, 2100, 2200, 2300, 2400, 2500, 2600, 2700, 2800, 2900, and 3000 Da.

In one embodiment, the soft block polymer $R_S$ is a polytetramethylene oxide having a molecular weight, $M_w$, of 250 Da.

In one embodiment, the first soft block polymer $R_S$ has a molecular weight, $M_w$, of 200-500 Da, and a second soft block polymer $R_S$ in a different compound having formula (I) has a molecular weight, $M_w$, of 1,500-2,000 Da.

In one embodiment, the first soft block polymer $R_S$ is a polytetramethylene oxide having a molecular weight, $M_w$, of 250 Da, and a second soft block polymer $R_S$ is a polytetramethylene oxide having a molecular weight, $M_w$, of 2,000 Da.

In the case of a composition wherein more than one soft block $R_S$ is used, the weight ratio of first and second $R_S$ is not particularly limited, and may range from >0-<100 wt %: <100->0 wt %. These ranges include all values and subranges therebetween, including >0, 1, 2, 3, 4, 5, 6, 7, 8, 9, 10, 15, 20, 25, 30, 35, 40, 45, 50, 55, 60, 65, 70, 75, 80, 85, 90, 95, 99, and <100 wt % as appropriate.

One embodiment provides a method of making the above compound, comprising:
reacting, in the presence of a catalyst, one or more soft block polymers $R_S$ end-capped with —$NH_2$, —OH, or combination thereof, with one or more compounds having the formula:

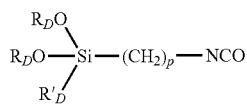

to form the compound.

In one embodiment, the end-capped soft block polymer $R_S$ has the formula $H_2N-R_S-NH_2$ or $HO-R_S-OH$.

In one embodiment, the catalyst is one or more of condensation cure catalyst, dibutyltin dilaurate, dibutyltin diacetate, diazabicyclo[2.2.2]octane, 1,3-diacetoxy-1,1,3,3-tetrabutyltin oxide, di-n-butylbis(1-thioglycerol)tin, di-n-butyldiacrylate, di-n-butyldi-n-butoxytin, di-n-butyldimethacrylatetin, platinum catalyst, addition cure catalyst, or combination thereof.

In one embodiment, the "hybrid" composition comprises a reaction product of:
  (A) one or more compounds having formula (I);
  (B) one or more alkoxysilane, alkoxysiloxane, or combination thereof as mesosurface builder;
  (C) optionally, one or more polydialkylsiloxane diol as first nanosurface modifier,
  (D) optionally, one or more fluorinated alkoxysilane as second nanosurface modifier, and
  (E) optionally, one or more of a catalyst, water, or combination thereof.

In one embodiment, as used herein, the "hybrid" reaction product is that which is obtained after the reaction proceeds to a completion greater than about 30%. This range includes all values and subranges therebetween, including 30, 40, 50, 60, 70, 80, 90, 95, 99, and 100%.

In one embodiment, the composition comprises a reaction product of:
  (A) one or more compounds having formula (I);
  (B) one or more alkoxysilane, alkoxysiloxane, or combination thereof as mesosurface builder;
  (C) one or more polydialkylsiloxane diol as first nanosurface modifier; and
  (E) optionally, one or more of a catalyst, water, or combination thereof.

In one embodiment, the composition comprises a reaction product of:
  (A) one or more compounds having formula (I);
  (B) one or more alkoxysilane, alkoxysiloxane, or combination thereof as mesosurface builder;
  (C) one or more polydialkylsiloxane diol as first nanosurface modifier;
  (D) one or more fluorinated alkoxysilane, fluorinated polydialkylsiloxane diol, or combination thereof as second nanosurface modifier, and
  (E) optionally, one or more of a catalyst, water, or combination thereof.

In one embodiment, the mesosurface builder (B) is one or more of poly(diethoxysiloxane) (PDEOS), poly(dimethoxysiloxane) (PDMOS), 1,2-bis(triethoxysilyl)ethane (BTESE), 1,4-bis(triethoxysilyl)benzene 1,2-bis(triethoxysilyl)ethylene, bis(triethoxysilyl)methane, 1,8-bis(triethoxysilyl)octane, 1,10-bis(trimethoxysilyl)decane, 1,6-bis(trimethoxysilyl)-2,5-dimethylhexane, 1,2-bis(trimethoxysilyl)ethane, bis(trimethoxysilylethyl)benzene, 1,6-bis(trimethoxysilyl)hexane, 1,4-bis(trimethoxysilylmethyl)benzene, 1,8-bis(trimethoxysilyl)octane, or combination thereof. In one embodiment, the In one embodiment, the first nanosurface modifier (C) is polydimethylsiloxane diol, polydiethylsiloxane diol, or combination thereof.

In one embodiment, the first nanosurface modifier (C) has a molecular weight, $M_w$, of 200-50,000 Da. This range includes all values and subranges therebetween, including 200, 225, 250, 300, 400, 450, 500, 600, 700, 800, 900, 1000, 2000, 2500, 3000, 3500, 4200, 4500, 5000, 5500, 6000, 6500, 7000, 7500, 10000, 15000, 20000, 25000, 26000, 30000, 35000, 40000, 45000, 50000, and any combination thereof.

In one embodiment, the first nanosurface modifier (C) is polydialkylsiloxane diol having a molecular weight, $M_n$, of 4200 Da. In one embodiment, the first nanosurface modifier is a polydimethylsiloxane diol.

Optionally, a second nanosurface modifier (D) may be present. Nonlimiting examples of the second nanosurface modifier include poly[methyl(3,3,3-trifluoropropyl)siloxane] diol, pentafluorophenyltrimethoxysilane, 3-(heptafluoroisopropoxy)propyltrimethoxysilane, nonafluorohexyltriethoxysilane, nonafluorohexyltrimethoxysilane, pentafluorophenylpropyltrimethoxysilane, pentafluorophenyltriethoxysilane, bis(pentafluorophenyl)dimethoxysilane, (tridecafluoro-1,1,2,2-tetrahydrooctyl)triethoxysilane, (tridecafluoro-1,1,2,2-tetrahydrooctyl)trimethoxysilane, p-trifluoromethyltetrafluorophenyltriethoxysilane, (3,3,3-trifluoropropyl)methyldimethoxysilane, (3,3,3-trifluoropropyl)trimethoxysilane, or combination thereof.

In one embodiment, two nanosurface modifiers are used, which may include for example, polydimethylsiloxane diol and poly[methyl(3,3,3-trifluoropropyl)siloxane] diol.

In one embodiment, the composition is optically transparent.

In one embodiment, (A) is present in the hybrid composition in an amount of about 50-95 wt % based on the weight of the composition. This range includes all values and subranges therebetween, including 50, 51, 52, 53, 54, 55, 56, 57, 58, 59, 60, 62, 64, 66, 68, 70, 75, 80, 85, 90, and 95 wt %, based on the weight of the hybrid.

In one embodiment, (B) is present in the hybrid in an amount of about 3-30 wt % based on the weight of the hybrid composition. This range includes all values and subranges therebetween, including 3, 4, 5, 6, 7, 8, 9, 10, 12, 14, 16, 18, 20, 22, 24, 26, 28, and 30 wt % based on the weight of the hybrid composition.

In one embodiment, (C) is present in the hybrid in an amount of about 0.004-20 wt % based on the weight of the composition. This range includes all values and subranges therebetween, including 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 12, 14, 16, 18, 20 wt %, based on the weight of the hybrid.

In one embodiment, (D) is present in an amount of about 0.004-20 wt % based on the weight of the composition. This range includes all values and subranges therebetween, including 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 12, 14, 16, 18, 20 wt %, based on the weight of the hybrid.

In one embodiment, the reaction product comprises one or more compounds having the following formula (II):

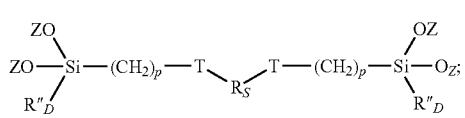

(II)

wherein each Z is independently Si or H; and
wherein each $R''_D$ is independently —$CH_3$, —$CH_2CH_3$, —$CH_2CH_2CH_3$, —$CH_2CH_2CH_2CH_3$, or —OZ. In this embodiment, the Si may be a siliceous silicon, or siloxane silicon. In one embodiment, the Si is a siliceous silicon.

In one embodiment, the hybrid composition includes an $SiO_x$ siliceous phase wherein x is 1.5-2. This range includes all values and subranges therebetween, including 1.5, 1.6, 1.7, 1.8, 1.9, <2.0, and 2.

The hybrid coating may be applied to a surface.

In one embodiment, the coating has a peak ice removal force of 1-300 kPa. This range includes all values and subranges therebetween, including 1, 2, 3, 4, 5, 6, 7, 8, 9, 10, 11, 12, 13, 14, 15, 16, 17, 18, 19, 20, 25, 30, 35, 40, 45, 50, 75, 80, 100, 200, 300 kPa.

One embodiment provides a coating composition, comprising:
(A) one or more compounds having formula (I);
(B) one or more alkoxysilane, alkoxysiloxane, or combination thereof as mesosurface builder;
(C) optionally, one or more polydialkylsiloxane diol as first nanosurface modifier,
(D) optionally, one or more fluorinated alkoxysilane as second nanosurface modifier,
(E) optionally, one or more of a catalyst, water, or combination thereof; and
(F) one or more solvent.

In one embodiment, the solvent (F) is tetrahydrofuran (THF), 2-methyltetrahydrofuran (MeTHF), ethanol, 2-propanol, n-propanol, 2-butanol, t-butanol, n-butanol, butyl acetate, acetone, ethyl acetate, or combination thereof.

One embodiment provides a method of making the composition of claim 15, comprising:
(1) reacting, in the presence of a first catalyst, one or more soft block polymers $R_S$ end-capped with —$NH_2$, —OH, or combination thereof,
with one or more compounds having the formula:

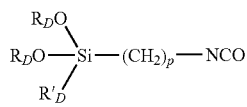

to form one or more compounds having formula (I);
(2) contacting one or more compounds of claim 1 having formula (I) with:
(B) one or more alkoxysilane, alkoxysiloxane, or combination thereof as mesosurface builder;
(C) optionally, one or more polydialkylsiloxane diol as first nanosurface modifier,
(D) optionally, one or more fluorinated alkoxysilane as second nanosurface modifier,
(E) optionally, one or more of a second catalyst, water, or combination thereof; and
(F) one or more solvent; and (3) allowing at least a portion of the solvent to evaporate;
(4) to form the composition of claim 15.

In one embodiment, the composition comprises a mixture of:
the composition of claim 15; and
one or more thermoplastic polyurethane.

In one embodiment, the mixture is a blend, immiscible polymer blend, compatible polymer blend, miscible polymer blend, interpenetrating polymer network, or combination thereof.

The thermoplastic polyurethane is not particularly limited, and may be a linear polymer, homopolymer, copolymer, thermoplastic elastomer, or combination thereof.

In one embodiment, the thermoplastic polyurethane is a copolymer comprising one or more polyurethane and/or polyurethane urea segments and one or more polyether segment, polydiene segment, polyolefin segment, polysiloxane segment, polyester segment, or combination thereof.

In one embodiment, the thermoplastic polyurethane has a molecular weight, $M_w$, of greater than 50,000 Da. This range includes all values and subranges therebetween, including 50,000, 55,000, 60,000, 65,000, 70,000, 80,000, 85,000, 90,000, 100,000, 200,000, 300,000 Da, and higher as desired.

In one embodiment, the mixture comprises 20-80 wt % of the hybrid composition and 80-20 wt % of the thermoplastic polyurethane. These respective ranges include all values and subranges therebetween, including 20, 22, 24, 26, 27, 29, 30, 33, 35, 37, 39, 40, 42, 43, 44, 45, 47, 49, 50, 55, 60, 65, 70, 75, and 80 wt % as appropriate.

The hybrid/polyurethane composition may be suitably applied to a surface, to provide a surface having a peak ice removal force of 1-300 kPa. This range includes all values and subranges therebetween, including 1, 2, 3, 4, 5, 6, 7, 8, 9, 10, 11, 12, 13, 14, 15, 16, 17, 18, 19, 20, 25, 30, 35, 40, 45, 50, 75, 80, 100, 200, 300 kPa. In one embodiment, the peak removal force is less than 100, 75, 50, 40, 30, 20, 10, and 5 kPa.

In one embodiment, a method of making the composition includes:
(1) reacting, in the presence of a first catalyst, one or more soft block polymers $R_S$ end-capped with —$NH_2$, —OH, or combination thereof,
with one or more compounds having the formula:

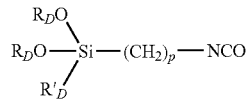

to form one or more compounds of claim 1 having formula (I);
(2) contacting one or more compounds of claim 1 having formula (I) with:
(B) one or more alkoxysilane, alkoxysiloxane, or combination thereof as mesosurface builder;
(C) optionally, one or more polydialkylsiloxane diol as first nanosurface modifier,
(D) optionally, one or more fluorinated alkoxysilane as second nanosurface modifier,
(E) optionally, one or more of a second catalyst, water, or combination thereof;
(F) one or more solvent; and
(G) one or more thermoplastic polyurethane; and (3) allowing at least a portion of the solvent to evaporate;
(4) to form the composition.

In one embodiment, a coating composition, comprising:
the hybrid composition;
one or more thermoplastic polyurethane; and
one or more solvent.

In one embodiment, the coating composition includes:
(A) one or more compounds having formula (I);
(B) one or more alkoxysilane, alkoxysiloxane, or combination thereof as mesosurface builder;
(C) optionally, one or more polydialkylsiloxane diol as first nanosurface modifier,
(D) optionally, one or more fluorinated alkoxysilane as second nanosurface modifier,
(E) optionally, one or more of a catalyst, water, or combination thereof;
(F) one or more solvent; and
(G) one or more thermoplastic polyurethane.

In one embodiment, a method for coating, comprising:
contacting a surface with any of the coating compositions described herein.

One embodiment provides monolithic, self-stratifying polymer coating, comprising:
inner and outermost surfaces on opposite sides of the coating, the inner surface being in contact with and adhered to an article;
a surface region, extending from the outermost surface to a depth of about 1-5 nm from the outermost surface, which range includes 1, 2, 3, 4, and 5 nm;
a middle region, extending between the surface region and the inner surface, and having a thickness of about 1,000 nm-1,000 μm, which range includes 1000 nm, 2000 nm, 3000 nm, 4000, 5000 nm and 1, 2, 3, 4, 5, 6, 7, 8, 9, 10, 200, 500, and 1000 μm; and
a bulk region, extending between the middle region and the inner surface, and having a thickness of about 25 μm or more, which range includes 25, 26, 27, 28, 29, 30, 100, 200, and 1000 μm.
wherein the surface region comprises one or more compounds having formula (II):

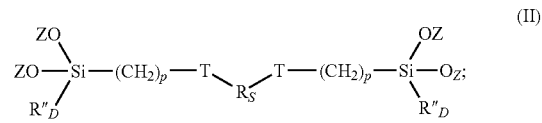

wherein $R_S$ is a soft block polymer;
wherein each T is independently a urethane or urea linkage;

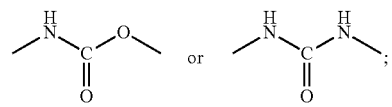

wherein each p is independently 1, 2, or 3.
wherein each Z is independently Si or H; and
wherein each $R''_D$ is independently —$CH_3$, —$CH_2CH_3$, —$CH_2CH_2CH_3$, —$CH_2CH_2CH_2CH_3$, or —OZ;
in a greater concentration relative to the middle and bulk regions;
wherein the middle region comprises —$SiO_{1.5}$ in a greater concentration relative to the surface and bulk regions;
and wherein the bulk region comprises a thermoplastic polyurethane in a greater concentration relative to the surface and middle regions.

The following table shows some nonlimiting examples of diols from which the soft block polymer $R_S$ is derived. In one embodiment, diamine may be used in place of the diol. Combinations of one or more diols, diamines, are possible.

|  | Designation | Full description | Structure |
|---|---|---|---|
| Polyether-based | PTMO | Poly(tetramethylene oxide) | HO-[(CH2)4-O]n-H |
|  | PEO | Poly(ethylene oxide) | HO-[CH2CH2-O]n-H |
|  | PPO | Poly(propylene oxide) | HO-[CH2CH(CH3)-O]n-H |
|  | POM | Poly(oxymethylene) | HO-[CH2-O]n-H |
| Polydiene-based | PBD | Polybutadiene diol | HO-[CH2CH=CHCH2]n-OH |
|  | PIP | Polyisoprene diol | HO-[CH2C(CH3)=CHCH2]n-OH |
| Polyolefin-based | PIB | Polyisobutylene diol | HO-[CH2C(CH3)2]n-OH |

| Designation | | Full description | Structure |
|---|---|---|---|
| Polysiloxane-based | PDMS | Polydimethylsiloxane | HO−[Si(CH₃)₂−O]ₙ−H |
| Polyester-based | PCL | Polycaprolactone | [−(CH₂)₅−C(=O)−O−]ₙ |
| | | Polycaprolactone | HO−[(CH₂)₅−C(=O)−O]ₙ−(CH₂)₆−[O−C(=O)−(CH₂)₅]ₙ−OH |
| | | Hydroxy terminated polyisobutylene | HO−[C(CH₃)₂−CH₂]ₙ−OH |
| | | Pentamethylene/Hexamethylene carbonate diol | HO−(CH₂)₅−[O−C(=O)−O−(CH₂)₅]ₘ−[O−C(=O)−O−(CH₂)₆]ₙ−OH |

Nonlimiting examples of the diamines may include the JEFFAMINE™ diamines, D, ED, and EDR series available from Huntsman.

The following table shows some nonlimiting examples of the alkoxysilane and alkoxysiloxane mesosurface builder useful for component (B). Combinations are possible.

| | | |
|---|---|---|
| PDEOS | Poly(diethoxysiloxane) | [structure: Si with OEt groups, repeating unit n] |
| PDMOS | Poly(dimethoxysiloxane) | [structure: Si with OMe groups, repeating unit n] |
| BTESE | 1,2-bis(triethoxysilyl)ethane | (EtO)₃Si−CH₂CH₂−Si(OEt)₃ |
| | 1,4-bis(triethoxysilyl)benzene | (EtO)₃Si−C₆H₄−Si(OEt)₃ |
| | 1,2-bis(triethoxysilyl)ethylene | (EtO)₃Si−CH=CH−Si(OEt)₃ |

-continued
| | |
|---|---|
| Bis(triethoxysilyl)methane | 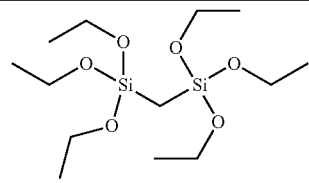 |
| 1,8-bis(triethoxysilyl)octane | 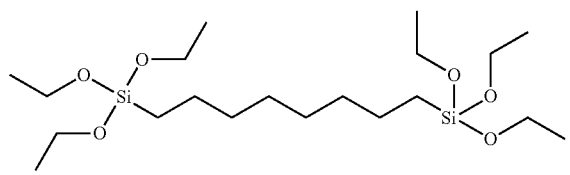 [SMILES: CCO[Si](CCCCCCCC[Si](OCC)(OCC)OCC)(OCC)OCC] |
| 1,10-bis(trimethoxysilyl)decane | 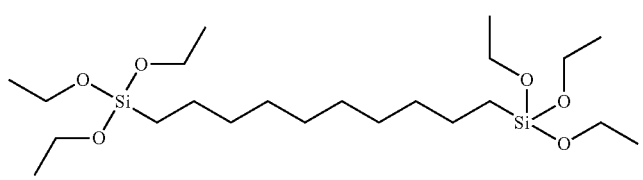 [SMILES: CCO[Si](CCCCCCCCCC[Si](OCC)(OCC)OCC)(OCC)OCC] |
| 1,6-bis(trimethoxysilyl)-2,5-dimethylhexane | 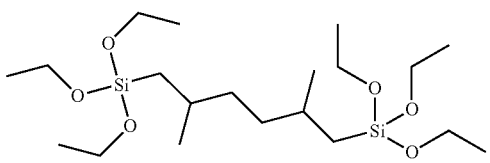 [SMILES: CCO[Si](CC(C)CCC(C)C[Si](OCC)(OCC)OCC)(OCC)OCC] |
| 1,2-bis(trimethoxysilyl)ethane | 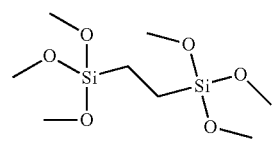 |
| Bis(trimethoxysilylethyl)benzene | 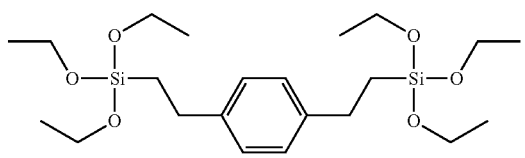 [SMILES: CCO[Si](CCc1ccc(CC[Si](OCC)(OCC)OCC)cc1)(OCC)OCC] |
| 1,6-bis(trimethoxysilyl)hexane | 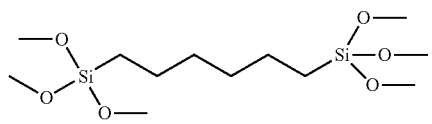 |
| 1,4-bis(trimethoxysilylmethyl)benzene | 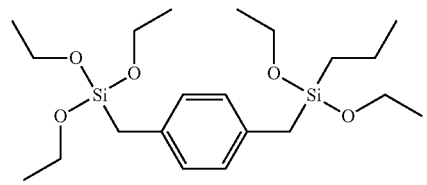 [SMILES: CCC[Si](Cc1ccc(C[Si](OCC)(OCC)OCC)cc1)(OCC)OCC] |
| 1,8-bis(trimethoxysilyl)octane | 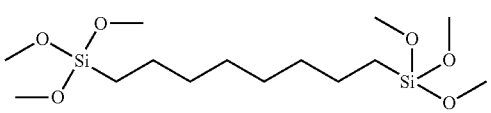 |

Nonlimiting examples of the polydiethoxysiloxanes may include the PSI-021, PSI-023, and PSI-026 available from Gelest, Inc.

The following table shows some nonlimiting examples of the first and second nanosurface modifiers. Combinations are possible.

| | |
|---|---|
| poly(dialkylsiloxane)diol | 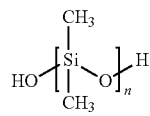 |
| Poly[methyl(3,3,3-trifluoropropyl)siloxane]diol | 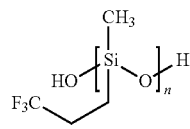 |
| Pentafluorophenyltrimethoxysilane | 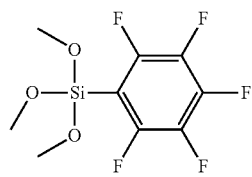 [SMILES: CO[Si](OC)(OC)c1c(F)c(F)c(F)c(F)c1F] |
| 3-(heptafluoroisopropoxy)propyltrimethoxysilane | 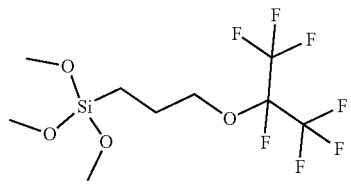 [SMILES: CO[Si](CCCOC(F)(C(F)(F)F)C(F)(F)F)(OC)OC] |
| Nonafluorohexyltriethoxysilane | 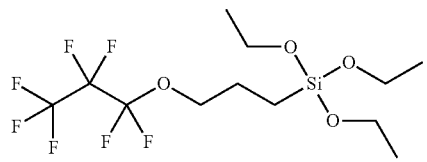 [SMILES: CCO[Si](CCCOC(F)(F)C(F)(F)C(F)(F)F)(OCC)OCC] |
| Nonafluorohexyltrimethoxysilane | 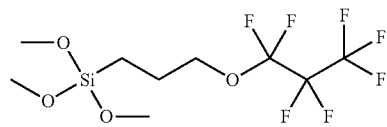 [SMILES: CO[Si](CCCOC(F)(F)C(F)(F)C(F)(F)F)(OC)OC] |
| Pentafluorophenylpropyltrimethoxysilane | 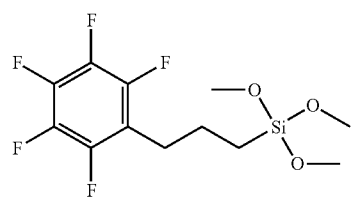 [SMILES: CO[Si](CCCc1c(F)c(F)c(F)c(F)c1F)(OC)OC] |
| Pentafluorophenyltriethoxysilane | 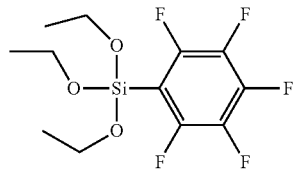 [SMILES: CCO[Si](OCC)(OCC)c1c(F)c(F)c(F)c(F)c1F] |
| Bis(pentafluorophenyl)dimethoxysilane | 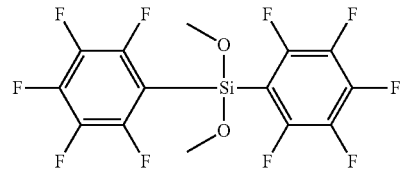 [SMILES: CO[Si](OC)(c1c(F)c(F)c(F)c(F)c1F)c1c(F)c(F)c(F)c(F)c1F] |

| | |
|---|---|
| (Tridecafluoro-1,1,2,2-tetrahydrooctyl)triethoxysilane | 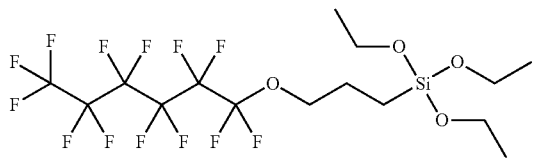 [SMILES: CCO[Si](CCCOC(F)(F)C(F)(F)C(F)(F)C(F)(F)C(F)(F)C(F)(F)F)(OCC)OCC] |
| (Tridecafluoro-1,1,2,2-tetrahydrooctyl)trimethoxysilane | 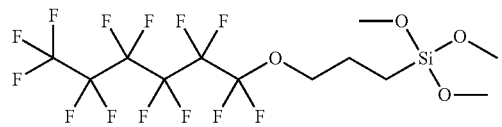 [SMILES: CO[Si](CCCOC(F)(F)C(F)(F)C(F)(F)C(F)(F)C(F)(F)C(F)(F)F)(OC)OC] |
| p-trifluoromethyltetrafluorophenyltriethoxysilane | 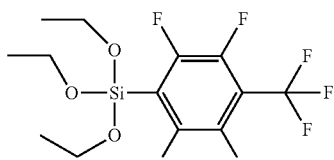 |
| (3,3,3-trifluoropropyl)methyldimethoxysilane | 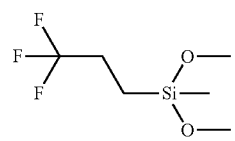 |
| (3,3,3-trifluoropropyl)trimethoxysilane | 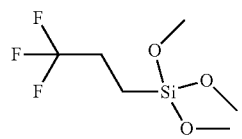 |

In the compounds in the tables above, the "n" value is not particularly limited, and may independently and suitably range from 1-10,000. This range includes all values and subranges therebetween, including 1, 2, 3, 4, 5, 6, 7, 8, 9, 10, 15, 20, 30, 40, 50, 60, 70, 80, 90, 100, 200, 500, 700, 900, 1000, 2000, 2500, 5000, 7500, and 10000 and any combination thereof.

In the compounds in the tables above, the "m" value is not particularly limited, and may independently and suitably range from 1-10,000. This range includes all values and subranges therebetween, including 1, 2, 3, 4, 5, 6, 7, 8, 9, 10, 15, 20, 30, 40, 50, 60, 70, 80, 90, 100, 200, 500, 700, 900, 1000, 2000, 2500, 5000, 7500, and 10000 and any combination thereof.

Catalyst

One embodiment provides an article selected from the group consisting of a mat, tile, polyurethane, vinyl refrigeration hanging strip, airfoil, wing, propeller, hull, superstructure, railing, intake, hatch, keel, rudder, deck, antenna, medical device, kitchen device, counter, pipe, wind turbine, aircraft, ship, rotor blade, transmission tower, transmission line, cable, cooling coil, refrigerator, freezer, or combination thereof, comprising any of the coatings or compositions on a surface thereon.

One embodiment provides a method, comprising applying any of the compositions described herein to a surface, and allowing the composition to cure, to produce a coated surface.

One embodiment provides a coated surface, comprising the cured product of any of compositions described herein in contact with a surface.

One embodiment provides a composition for coating, comprising any of the compositions described herein and a solvent.

EXAMPLES

Examples

The following examples are provided for illustration only and are not limiting unless otherwise specified.

ER-Coat-1 and ER-Coat-2 Hybrid Coatings

Experimental Section

Materials.

Poly(tetramethylene) oxide 2000 g/mol (PTMO-2K) and dibutyltin dilaurate (T-12) were purchased from Aldrich. Isocyanatopropyltriethoxysilane (ICP-Si(OEt)$_3$), hydroxyl terminated poly (polydimethylsilane) cst (Silanol), and bis (triethoxysilyl)-ethane (BTESE) were purchased from Gelest, Inc. Tetrahydrofuran (THF) was purchased from Acros. Estane ALR E72A was purchased from Lubrizol. Isopropanol (IPA) was purchased from Fisher Scientific.

Preparative Procedures.

TPU Purification.

Example 1: Polyurethane Purification

In a 60 mL vial, 30 grams of methanol and 6 grams of THF were mixed. Into the vial, 3 grams of polyurethane pellets (Lubrizol Estane ALR-E72A) was added. The mixture was then heated to 60° C. PU pellets swell to at least double their original size within one hour, which further coalesced into one piece overnight.

Every 24 hours, a sample was taken and dried under vacuum to remove solvents. A few dried pellets were soaked in clean water that was confirmed by pre-interrogation water check with flamed glass slide and dynamic contact angle (DCA, Wilhelmy plate, degrees). After at least 5 minutes of soaking the purified polyurethane pellets, the water was checked with DCA using a flamed glass slide to determine whether contamination is present (i.e., small molecule or surface active molecules leaching out of the purified polyurethane). After at least 5 minutes of soaking, a water check with DCA and flamed glass slide is done to check whether contamination is detected. Samples were checked at 24, 48, 72, and 96 hour. The results (not shown) indicate that for PU pellets soaked in methanol/THF mixture for 96 hours, water contamination is negligible after 96 hours.

Example 2: Polyurethane Purification

In a 200 mL vial, 100 grams of ethanol and 20 grams of THF were mixed. Into the vial, 10 grams of polyurethane pellets (Lubrizol Estane ALR-E72A) was added. The mixture was then heated to 30° C. PU pellets swell to at least double of its original size within 24 hours. The pellets were soaked for 2 weeks and no significant coalescence was observed. Ten pellets were taken out and dried under vacuum to remove solvents. Five dried pellets were soaked in clean water that was confirmed by pre-interrogation water check with flamed glass slide. After at least 5 minutes of soaking, a water check with flamed glass slide showed no water contamination.

Example 3: Polyurethane Purification

In a 250 mL vial, mix 150 grams of IPA and 30 grams of THF. Into the vial, add 15 grams of polyurethane pellets (Lubrizol Estane ALR-E72A). The mixture was then heated to 40° C. PU pellets swell to at least double of its original size within 24 hours. The pellets were soaked for 1 week. Pellets are then filtered out and dried at 60° C. for overnight before vacuum dry at the same temperature for 24 hours. Samples are analyzed by using GPC to confirm molecular weight.

TPU Molecular Weight.

A commercial thermoplastic polyurethane (TPU), Lubrizol Estane ALR-E72A was used in place of HMDI/BD-30-(PTMO). While the structure of this polymer is a trade secret, a survey of several candidates showed that this TPU has a similar FTIR spectrum, solubility and mechanical properties as the in-house base polyurethane. A purification process was developed for this commercial resin to remove processing agents and additives that may affect the surface properties of the finished coatings. It was accidentally found that this purification process improved ice release performance. GPC results (FIG. 1) showed a higher molecular weight for purified ALR-E72A and reduced molecular weight distribution. Our working hypothesis is that the high molecular weight of this TPU resin was essential for driving sufficient phase separation with the formation of functional mesosurface. The lower molecular weight fraction in the as received resin as well as the unknown processing additives may be the cause for poor ice release performance. Even with high molecular weight and stratification promotion, excellent miscibility of purified ALR-E72A with the PTMO hybrid solvent systems made for easy processing. Final coatings had good transparency. Optical transparency is essential for top coating for applications such as over decals or over product identification information.

PTMO triethylsilane capping.

PTMO diol is first end-caped with ICP-Si(OEt)$_3$ at a mole ratio of 1:2 with T-12 catalyst at elevated temperature (Scheme 1).

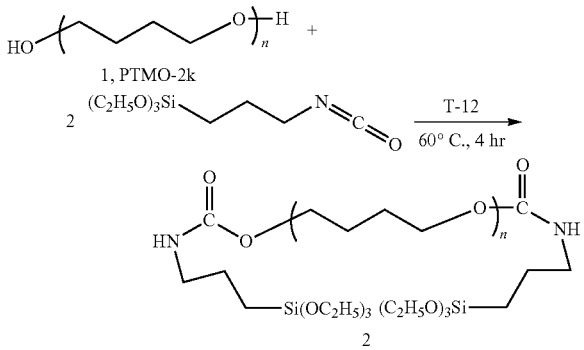

Example 1

6.4 g of PTMO-2K were dissolved with 12.0 grams of THF in a 20 mL screw cap vial. After complete dissolution of PTMO-2K, 1.6 g of (ICP-Si(OEt)$_3$) and 5 drops of T-12 (10 wt % solution) were added to the vial and mixed until homogeneous. The reaction mixture was placed in an oven at 60° C. for 4 hours. Reaction completion was determined by the disappearance of the isocyanate IR absorption peak at 2200 cm$^{-1}$. Final solution concentration was 40 wt %.

PTMO Hybrid Coatings (ER-Coat 1).

PTMO Hybrid coatings (ER-coat-1) were prepared base on desired hybrid content by mixing end-caped PTMO (2), purified TPU and BTESE (Scheme 2).

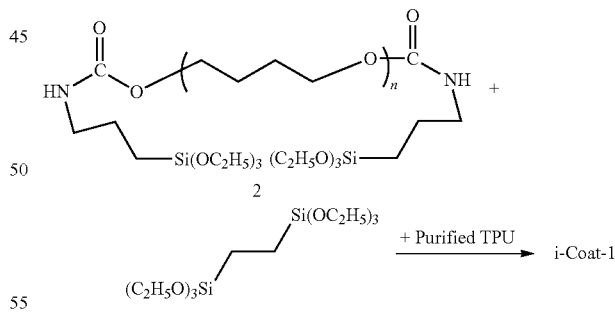

Example 2

The hybrid coating consisting of 40 wt % triethylsilane capped PTMO hybrid and will be described. 9 g of THF were added to a screw cap vial followed by 0.6 g of Estane ALR E72A. The mixture was stirred to obtain homogeneity. After stirring, 1 g of 40 wt % triethylsilane capped PTMO and 0.06 g of BTESE were added and mixed until homogeneous. The solution is then drip coated onto glass microscope slides and left to cure at room temperature for 24 hrs.

Example 3

2.215 gram of PTMO is mixed up with 0.572 gram of ICP-Si(OEt)$_3$ and 11 gram THF and 2 drops of 10 wt % T-12 solution in a 20 ml glass vial. The vial is agitated well to ensure dissolution of PTMO in THF, sealed and heated up to 60° C. for 4 hours. While the end-capping reaction taking place, 2.810 gram of purified TPU was dissolved in 25 gram of THF. After TPU solution and end-caped PTMO are ready, they are mixed together with 0.281 gram of BTESE. The mixture was stirred for 10 minutes before coatings were made on glass slides, primed aluminum substrates using drip-coat method.

PDMS Modified Hybrid Coatings (ER-Coat 2).

PDMS modified hybrid coatings (ER-coat-2) are prepared in a similar manner as that of ER-coat-1. Since coatings with various hybrid and PDMS modifier content have been prepared, the procedure for preparing a 40 wt % hybrid coating with 1 wt % PDMS will be given.

Scheme 3, ER-coat-2 preparation

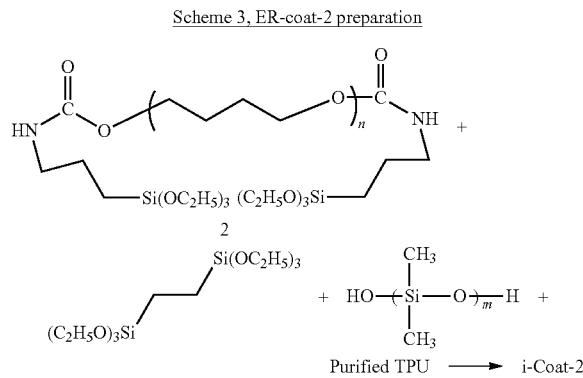

Example 4.

0.6 g of Estane ALR E72A was dissolved in a screw cap vial with 8.3 g of THF until homogeneous. After mixing, 0.978 g of 40 wt % triethylsilane capped PTMO solution, 0.04 g of BTESE and 0.08 g of 5 wt % PDMS solution were added to the vial and mixed until homogenous. The solution is then drip coated onto glass microscope slides and left to cure at room temperature for 24 hrs.

Example 5

20.015 gram of PTMO is mixed up with 5.102 gram of ICP-Si(OEt)$_3$ and 75.50 gram THF and 10 drops of 10 wt % T-12 solution in a 120 ml plastic bottle. The vial is agitated well to ensure dissolution of PTMO in THF, sealed and heated up to 60° C. for 4 hours. After reaction finished, the sealed bottle was placed in refrigerator prior to use. The solid content of this solution is 25 wt %.

250 gram stock solution of 6 wt % TPU in THF was prepared with 15 gram TPU and 235 gram THF.

In a small glass vial, 0.673 grams of the previous prepared end-caped PTMO solution at 25 wt % solid content (net 0.0.168 gram end-caped PTMO) was mixed up with 4.180 gram TPU solution (0.251 gram TPU solid), 0.0022 gram BTESE, and 0.0041 gram hydroxyl terminated PDMS. A coating of 50 micron was made with this solution by drip coat 1 gram solution onto a 1"×3" glass slide.

Final Hybrid Percentage Calculation.

Hybrid percentage after curing was calculated to determine whether if it was consistent with the feed of triethylsilane capped PTMO and BTESE. As seen in Table 1, it has been confirmed that the final hybrid concentration is approximately 38%. This is within experimental error of the initial feed concentration of 40 wt % (Table 1).

TABLE 1

| Final Hybrid Percentage | | | |
|---|---|---|---|
| | Reactant Feed or Product (g) | Reactant Feed or Product (mol) | Molecular weight, Da |
| PTMO mod. | 0.396 | 1.59E−04 | 2494.72 |
| PDMS | 0.004 | 1.45E−06 | 2750 |
| BTESE | 0.04 | 1.13E−04 | 354.59 |
| TPU | 0.6 | | |
| Evolved Ethanol | 0.075 | 1.63E−03 | |
| Net water reacted | 0.015 | 8.15E−04 | |
| Hybrid solid | 0.380 | | |
| TPU wt % | 61.24 | | |

Mechanical Testing.

The mechanical strength of the new hybrid coatings was evaluated by tensile testing. Rectangular samples were cut from coated slides and measured for thickness, width, and gauge in millimeter. Samples were then clamped into the holder of a TA Instruments RSA-III. The sample elongation rate was 0.05 mm/s with a data acquisition rate of 1 Hz (24° C.). Tesile testing determined the strain at break for PTMO hybrid samples to be 600% and a ultimate strength to be 15 MPa.

Ice Release.

Ice release test were performed using the RSA-III with a modified force probe. Ice cylinders were prepared by freezing water on the surface of the hybrid coating via the use of molds 8-10 mm in diameter. After freezing, samples were then placed in a fabricated holder in the RSA-III and the temperature of the sample chamber is allowed to equilibrate at −10° C. The probe speed (shear rate) was set to 3 mm/min (50 μm/s). Peak removal stress ($P_s$) was determined along with removal energy (RE), which is the area under the curve, FIG. 2. The PTMO hybrid coating composition that has thus far exhibited the best ice release properties is the 40 wt % PTMO hybrid with an average $P_s$ of ~180 kPa and a RE of 0.01 kJ/m$^2$. The best performing PDMS modified hybrid coating has thus far been the 40 wt % PTMO h]ybrid with 1 wt % PDMS (ER-Coat-2, shown in FIG. 3). Average $P_s$ and RE where ~80 kPa and ~0.0086 kJ/m$^2$.

Comparison to Commercial Coatings.

Figure 4:
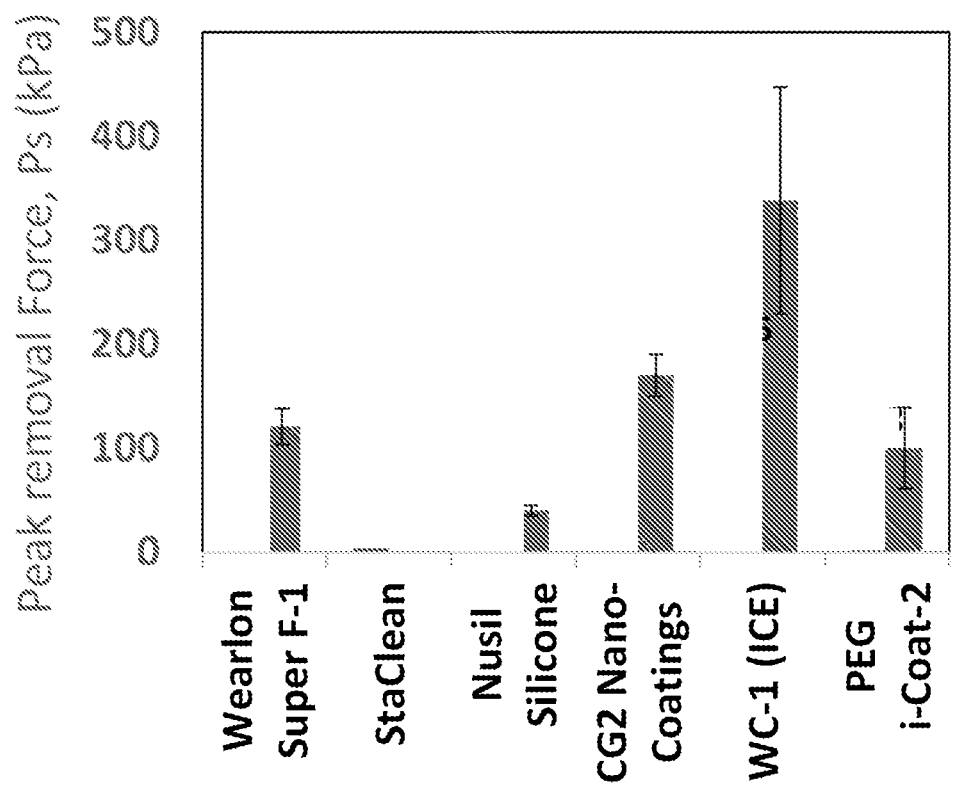
FIG. 4 presents peak removal forces for various coatings.

FIG. 4 shows commercially available coatings for which ice release claims have been identified. The bar graph shows peak removal force in shear, $P_S$. The lower the peak removal force, the easier it is to remove ice. As seen in the figure, ER-Coat-2 has 40% easier ice removal compared to Wearlon Super F-1. In addition, ER-Coat-2 is tough compared to silicone competitors (e.g., Nusil, IceSlick, Wearlon, and CG$^2$ Nano-Coatings).

TABLE 2

| Commercial coatings | |
|---|---|
| Wearlon Super F-1 | Silicone-epoxy |
| StaClean | Fluoro-urethane/Silicone |
| Nusil | Silicone |
| CG$^2$ NanoCoatings | Silicone nanocomposites |
| IceSlick | Silicone |
| 21$^{st}$ Century Coatings WC-1(ICE) | Fluorinated polyurethane |

B. Specific Background.

Figure 5:
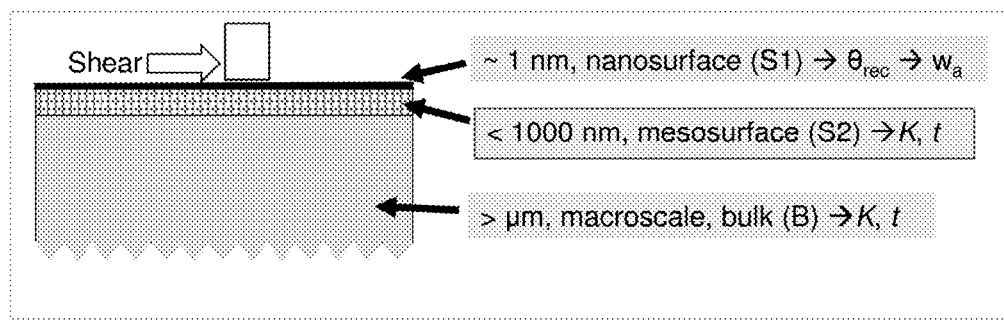
FIG. 5 presents contributions of nanosurface, mesosurface and bulk to adhesion in shear. Kendall's theory, adapted for ice removal: Peak Removal Force in shear is designated $P_s$ correlates coating parameters: work of adhesion (wa), modulus (K), and thickness (t) with peak removal force $P_s$. $Ps \propto A(2w_a K/t)^{1/2}$ (Eq. 1) (Kendall, K. J. Physics D Applied Physics 1971, 4, 1186-1195).

A fundamental study of adhesion of epoxied aluminum cylinders (ECs) to a novel fluorous hybrid elastomer led to the discovery that adhesion in shear depends on three parameters: (1) work of adhesion, i.e. surface energy (nanosurface), (2) near surface modulus (mesosurface), and (3) coating geometry, i.e. thickness (bulk). This three tier concept is illustrated in FIG. 5 and described in the paper "*Rigid Adherent-Resistant Elastomers (RARE): Nano-, Meso-, and Microscale Tuning of Hybrid Fluorous Polyoxetane-Polyurethane Blend Coatings*". It is important to note that the newly proposed mesosurface (~1000 nm) contribution to diminishing adhesion in shear is not well understood. It appears that a low modulus for the soft, near surface hybrid domain decreases adhesion.

This fundamental study at Virginia Commonwealth University (VCU) on epoxied aluminum cylinders led to a study of ice adhesion, i.e., ice as a "rigid adherent". Coatings were made on glass microscope slides and a sample holder was devised for ice cylinders frozen onto these coatings. Preliminary studies at −10° C. using the same fluorous hybrid elastomers noted above led to the exciting discovery that ice-adhesion strength is dependent on the same three coating parameters illustrated in FIG. 5. Furthermore, ice adhesion was found to be very low for optimum fluorous hybrid elastomer compositions (around 50 wt % urethane), which is exactly the compositional range that minimizes epoxied aluminum cylinder adhesion. A key advantage of these hybrid coatings is their mechanical strength and easy processing.

The underpinning for the three-parameter dependence of ice adhesion (and EC adhesion) is Kendal adhesion theory for force required to remove a rigid object from an elastomer (FIG. 5, Eq 1). Kendall developed this theory for adhesion of a rigid object bonded to an elastomeric thin film. While acknowledging that the "fit" of this theory to micron scale coating is only approximate, the guidance of theory has proved important. In addition, we have learned invaluable "practical lessons" that have resulted from systematic studies of composition and processing parameters.

Moving on from expensive fluorous polymeric materials, this SBIR Phase I project was proposed to partially or completely replace fluorous coatings with relatively inexpensive, commercially available engineering materials. The objective was to use the new model described in FIG. 5 to engineer economical coatings having excellent ice-release properties. Scheme 4 illustrates our present "state-of-the-art" that will be described further.

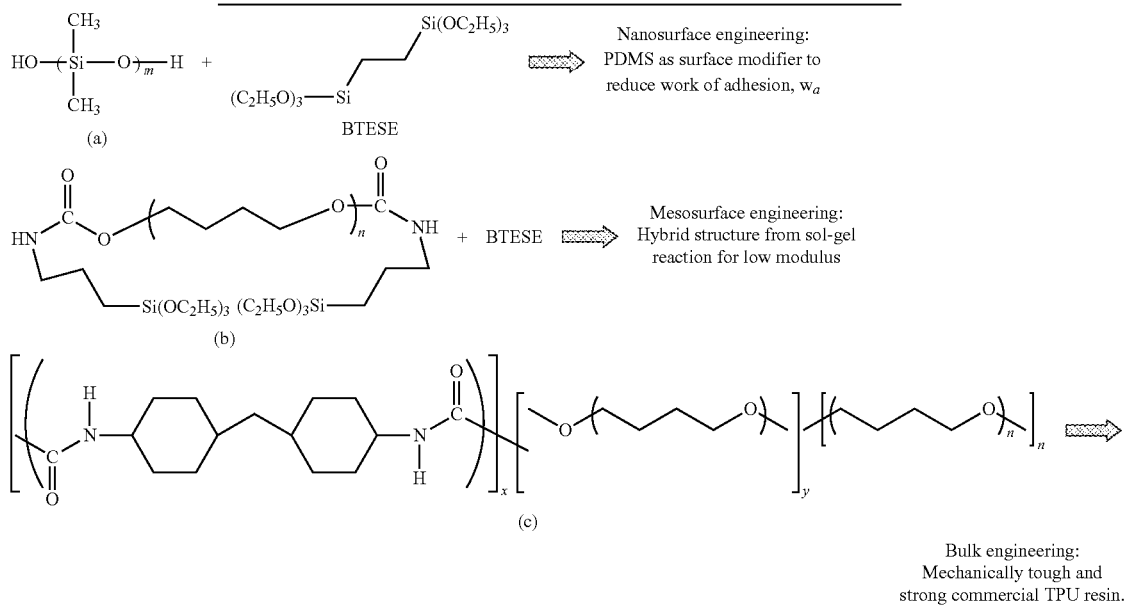

Scheme 4. General scheme for a recent "breakthrough-coating" achieved in Phase I. Bistriethoxysilane (BTESE) acts as crosslinker, mesosurface builder, and binding agent for nanosurface, mesosurface and bulk coating adhesion to substrates.

C. Details on Accomplishments.

(1) Ice Release Test Method.

Figure 6:
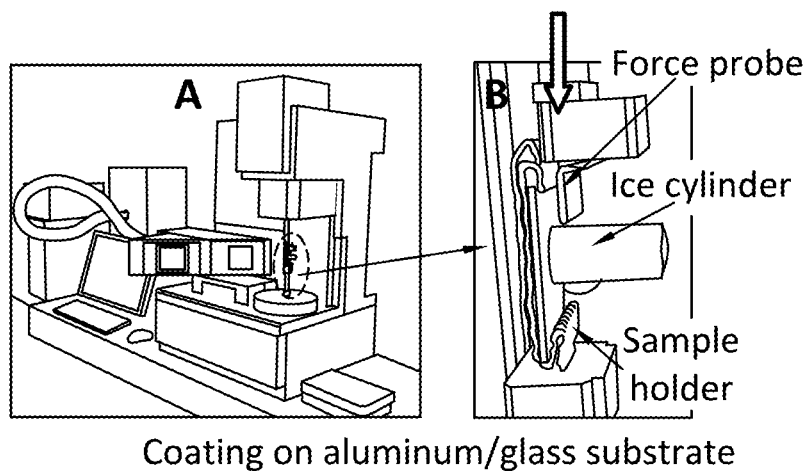
FIG. 6 shows apparatus for ice adhesion measurement: A, TA Instruments RSA III dynamic mechanical analyzer with temperature-controlled chamber; B, ice cylinder on transparent coating in sample holder.

Ice adhesion tests were conducted by using a commercial RSA-III Dynamic Mechanical Analyzer (DMA) by TA Instruments. The RSA-III has a controlled temperature chamber that was fitted with a specially fabricated glass microscope slide holder as shown in FIG. 6.[2] For ice adhesion tests, temperature control is achieved with an accuracy of ±0.5° C. from −90 to −5° C. with the controller cooled by liquid nitrogen boil-off. The RSA-III has a 3.5 kg load cell having 0.2 mg resolution. The low stress limit of this load cell provides precision and accuracy are achieved for measuring weakly bonded objects. Coatings with high ice-adhesion strength cannot be tested but they are not of interest.

(2) Coating Component Characterization and Tests.

Figure 7:
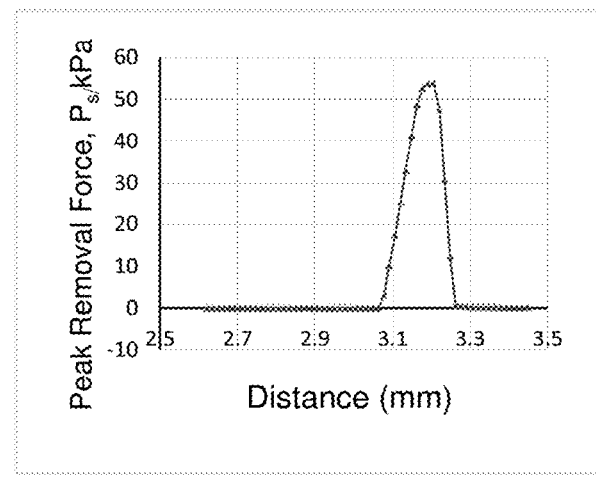
FIG. 7 shows a representative force-distance curve showing peak removal force Ps. This run is one of several acquired on 50 μm ER-coat-2 to explore reproducibility (see FIG. 8).

A recent breakthrough-coating designated ER-coat-2 was developed guided by theory and our experience. The strategy for nanosurface, mesosurface and bulk engineering is shown in Scheme 1. FIG. 7 shows a typical test result for the most recently developed hybrid ER-coat-2 coating. The ice cylinder contact area is constant so that force is shown as stress (kPa). The maximum before ice cylinder removal is the peak removal force in shear, designated $P_s$. By using the RSA III test method, coating development was accelerated due to fast testing turn-around time. Evaluation of peak removal force $P_s$ for ice release via a laboratory based test has explored for many coating compositions and processes.

Figure 8:
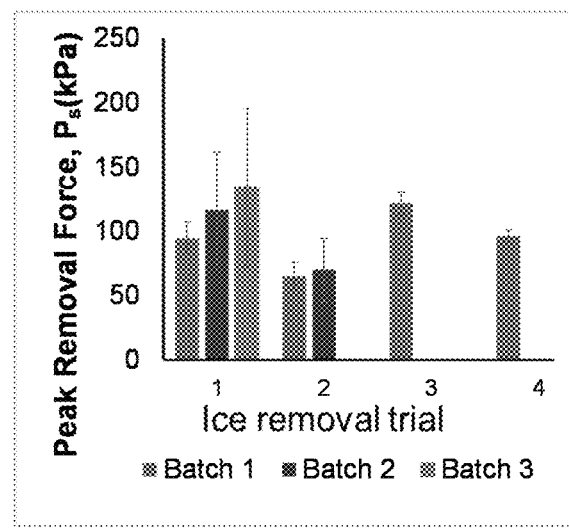
FIG. 8 shows peak removal force for three independently prepared and processed ER-coat-2 coatings with 1 wt % PDMS. Several ice release trials were used for each run.

PEG LLC also evaluated coatings with third party testing facilities at Penn State. The results obtained validated PEG LLC's ice adhesion measurements using the RSA III. The ER-coat-2 coating was independently prepared three times and tested several times to confirm ice-adhesion strength less than 100 kPa (FIG. 8). Ice adhesion strength less than 100 kPa or 0.10 MPa is considered the threshold for many practical de-icing applications. The low $P_s$ for ER-coat-2 is nearly as good as the fluorous hybrid coating that initially sparked our interest.

The mechanical strength of the new hybrid coatings was evaluated by tensile testing. A 700% of strain at break and a 10 MPa ultimate strength were found. Based on mechanical and physical properties, promising erosion and wear resistance are anticipated; these features are important for many deicing applications that face challenging environmental conditions. A systematic study of erosion/wear resistance is planned for Phase II research and development. A Phase II plan addresses the development of coatings with even lower ice adhesion strength.

a. Nanosurface.

Initially, we used a commercially available fluorous polyoxetane (3F and 5F) to decrease work of adhesion. 3F and 5F resulted in phase separation described in Section 3. As an alternative, we turned to silicone (PDMS) surface modification. Thus far, the relationship of wt % PDMS and coating thickness has been explored. These are inter-related as described below. A PDMS diol with a molecular weight of 5 kDa was chosen for nanosurface modification. As noted above, a 50 μm ER-coat-2 coating (1 wt % PDMS) had a peak removal force $P_s$ less than 100 kPa, which was the lowest peak removal force of all coatings tested (FIGS. 6, 7, and 8).

Figure 9:
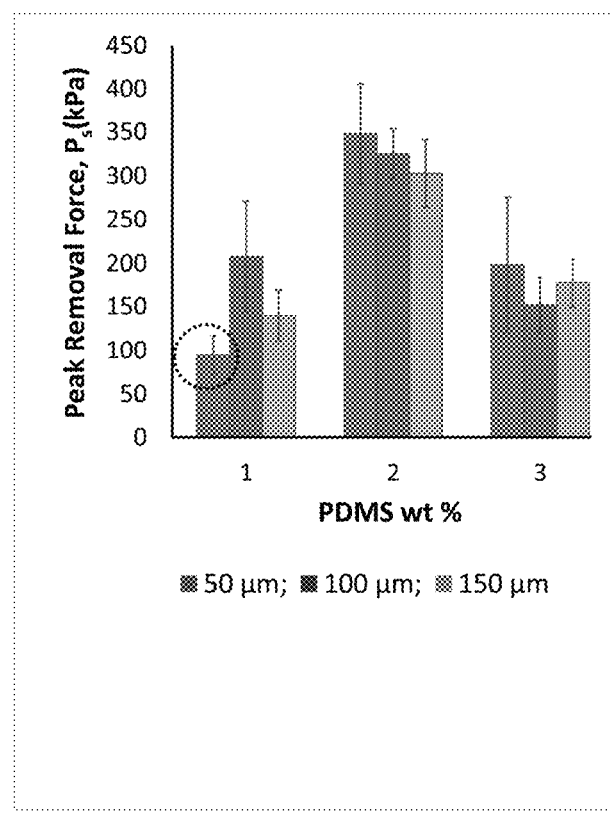
FIG. 9 shows peak removal force dependence on the surface modifier weight percent for 50, 100 and 150 μm. Circled shows ER-coat-2, 1 wt % PDMS, 50 μm.

In a study of the effect of surface modifier wt % on peak removal force, more surface modifier was found to give higher peak removal force. FIG. 9 shows the dependence of $P_s$ on PDMS content from 1 to 3 wt % for a hybrid system contains 60 wt % polyurethane (40 wt % hybrid) at three different thicknesses. The complex interplay of thickness and modifier is evident. Without question, the best performer (noted above) was ER-coat-2, 50 μm and 1 wt % PDMS nanosurface modifier.

Perhaps higher surface modifier weight percent (2, 3) leads to nanosurface and mesosurface phase separation that sequesters the PDMS function. The "More is Less" phenomenon was reported by Zhang and Wynne for a PDMS system with a perfluorinated surface modifier.[2] In this case, "More is Less" referred to a high contact angle that "crashed" above concentration modifier that caused near surface phase separation.

It is not clear why the ER-coat-2 composition with 1 wt % PDMS and thickness (50 μm) gives such a low ice removal force. Work will be proposed in Phase II to explore what factors contribute to this finding. Contributors may be PDMS molecular weight, BTSE wt % (which generates the mesosurface hybrid composition), and/or feed sequence for the precursor coating solution. We recognize that Scheme 1 provides guidance, but specific experimental parameters that optimize ice release must be determined by systematic R&D including the engineering approach of "Design of Experiment". In the meantime, the optimum composition, designated ER-coat-2 is being used for tests at Smithfield Foods in connection with formation of a strategic partnership and product development that will be described in the Phase II commercialization plan.

b. Mesosurface.

Previously, we explored the compositional dependence of "U-3F-x" on epoxied aluminum cylinder adhesion.[1] For minimizing adhesion, a "sweet spot" was found in the range 40-50 wt % linear polyurethane U-3F, alternatively expressed as 60-50 wt % hybrid component. Furthermore, ATR-IR spectroscopic evidence showed that the hybrid component was "mesosurface-concentrated" (FIG. 2) and contributed to easy release in shear.

Figure 10:
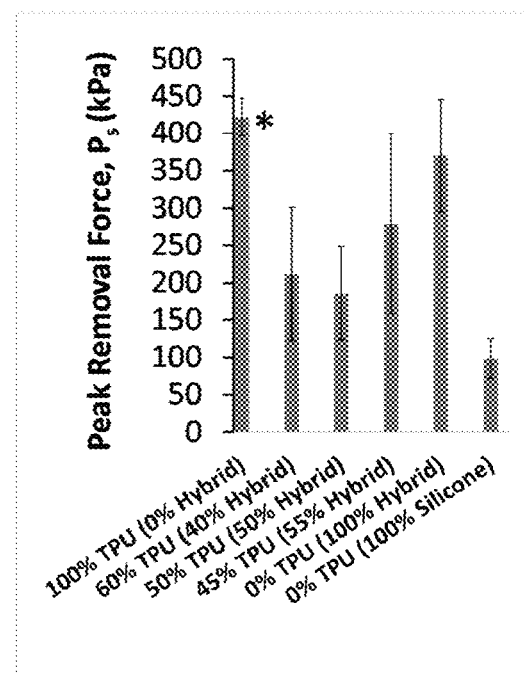
FIG. 10 shows peak removal force as a function of TPU content (hybrid content) for ER-coat-1 without surface modifiers. *Cohesive failure was observed for 100% TPU coatings.

Guided by the prior findings, a range of 40-60 wt % polyurethane was studied to establish the contribution of hybrid/mesosurface (no PDMS modifier). FIG. 10 shows that the ER-coat-1 system with 45-60 wt % polyurethane has much easier ice release performance compared to the polyurethane (100% TPU) or the 100% hybrid. The working hypothesis to explain the remarkably low ice release of the 50 wt % urethane ER-coat-1 system is the soft mesosurface illustrated in FIG. 2.

It should be noted that only cohesive failure was observed for ice frozen on 100% TPU. That is, the locus of fracture was within the ice cylinder, not at the ice-polymer interface. Further tests and compositional variations are currently being conducted and will be proposed for Phase II to explore whether even better performance can be realized.

c. Bulk Polyurethane.

In prior work, a high molecular weight ($M_w$, 110 kDa) fluorous polyurethane "U-3F" was employed.[1] Our initial encouraging results for ER-coat-1 were obtained with a purified commercial thermoplastic polyurethane (TPU), Lubrizol Estane ALR-E72A that had a high molecular weight: $M_w$~233 kDa. Later, another ER-coat-1 coating was made with laboratory prepared polyurethane of a similar composition but $M_w$ of ~20 kDa. To our dismay, the hybrid coating made with the 20 kDa polyurethane had a high peak removal force for ice release that was little better than the polyurethane itself (no hybrid component). Our working hypothesis to explain this result is that the high MW polyurethane drives mesosurface/bulk phase separation essential for low ice release. As a result, we have used high MW polyurethanes for "bulk" composition. There are other important details with regard to the bulk polyurethane noted in the section "Problems Encountered and Methods of Resolution".

(3) Thickness Dependence of Ice Release.

Figure 11:
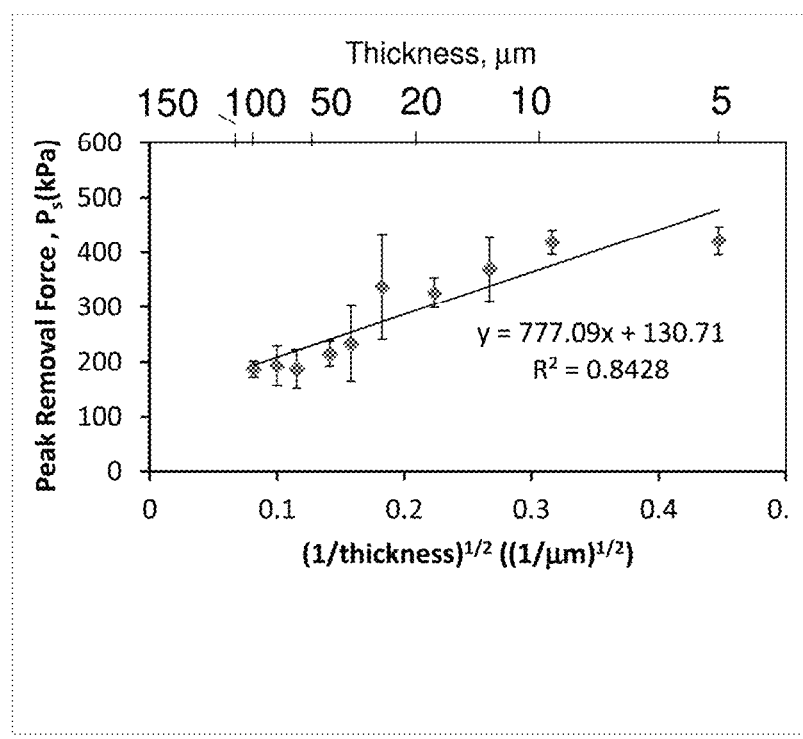
FIG. 11 shows peak removal force dependence on coating thickness for the base hybrid system using PTMO hybrid and TPU system without surface modifier.

Based on Kendall theory, peak removal force has an inverse linear relationship with square root thickness, $(1/t^{1/2})$. To investigate thickness dependence, hybrid elastomer coatings having 50 wt % polyurethane (ER-coat-1) were prepared without PDMS nanosurface modifier. FIG. 11 shows the dependence of $P_s$ on coating thickness. Over the thickness range of 5-15 μm, $P_s$ decreases by a factor of ~2. Because these coatings do not have a PDMS modified nanosurface, a minimum for $P_s$ is ~200 kPa at the higher coating thickness range (~100 μm). Overall, there is very good agreement with Kendal theory. Perhaps the dependence of peak removal force on thickness asymptotes at ~50 to 150 μm. Studies will be proposed for Phase II to confirm this finding and to investigate the relationship of thickness to wt % PDMS modifier.

(4) Ice Adhesion Test Check at an Aerospace Facility.

Figure 12:
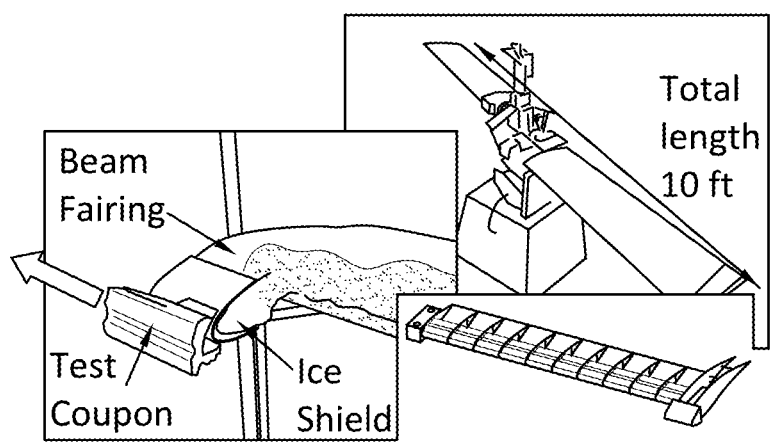
FIG. 12 presents an illustration of ice adhesion test using the Adverse Environment Rotor Test Stand (AERTS) at the Vertical Lift Research Center of Excellence (VLRCOE), in Aerospace Engineering at Penn State.

There is no standard method for testing ice adhesion. A goal of the Phase I effort was to compared the VCU laboratory test procedure described above with results from a well-known aerospace facility dedicated to ice release testing. To investigate this issue, Dr. Jose L. Palacios, Director of the Adverse Environment Rotor Test Stand (AERTS) facility in the Aerospace Engineering Department at Penn State University was contacted. Dr. Palacios introduced us to the AERTS test procedure, which is explained briefly here. FIG. 12 shows the rotor beam, with coated coupons mounted on the end of test beam leading edge. This test was designed to reproduce natural icing conditions such as those on a helicopter rotor or airplane wing. The rotor for the Penn State test has a diameter of 10 ft and tip speeds up to 470 ft/s.

When subjected to an icing environment, ice accretes on the test specimen. This additional mass increases the centrifugal force of the coupon assembly on the beam, causing it to deflect and to increase the strain read by the strain gauge mounted at the base under the coating. When ice reaches a critical mass, it releases from the fixture, instantly reducing the strain in the beam. The critical ice mass relates to the ice adhesion strength. The change in strain can be related to the ice mass on the beam prior to release.[6-8]

Figure 13:
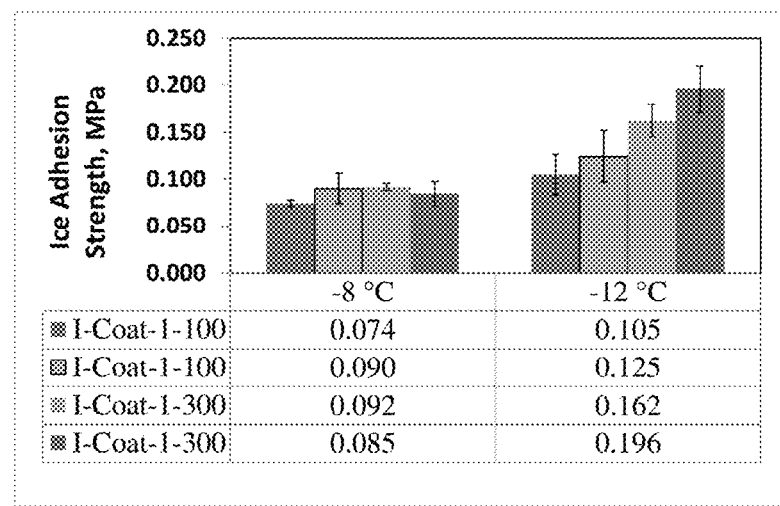
FIG. 13 shows results of ice adhesion test using the Adverse Environment Rotor Test Stand (AERTS) in the Vertical Lift Research Center of Excellence (VLRCOE) of Penn State.

A set of hybrid coatings without PDMS surface modifier (ER-coat-1) was evaluated using the AERTS facility at Penn State. Two sample thicknesses were chosen: 100 and 300 μm (FIG. 13). The experiment was carried out at two temperatures, −8 and −12° C. The selection of these two temperatures resulted from the cooling capacity of the system and on the air temperature at the test time. FIG. 13 shows the testing results for the two ER-coat-1 systems. Ice adhesion strength is below 100 kPa at −8° C. and ~150 kPa at −12° C.

VCU tests for ER-coat-1 coatings with ~150 μm thickness gave $P_s$~180 kPa (FIG. 11). Considering the differences in ice formation and handling, the data acquired at AERTS are in fair agreement with PEG LLC's tests using the RSA III. The AERTS data shows lower ice adhesion strength at −8° C. than at −12° C. The Penn State test involves an exothermic phase transition (water droplets →ice) right on the coating surface. Thus the sprayed water droplets increase the temperature during a test run. Therefore, the actual temperature on the ice/coating interface may not be quite as low as the designed temperature. This may explain why the Penn State −12° C. results agree more closely with VCU data at −10° C. This result provides confidence and validation to our laboratory-devised RSA III testing method.

In April 2013 ER-coat-1 was chosen for Penn State testing before ER-coat-2 (PDMS modified) coatings were developed in May. Also, this test was carried out before details of thickness dependence were known (FIG. 11). In Phase II we will propose additional tests at Penn State on ER-coat-2 systems. Such tests will move PEG LLC forward in establishing credibility for wind tunnel tests at Boeing and other aerospace facilities.

(5) Temperature Dependence of Ice Adhesion.

Little is known about the dependence of ice release on temperature for polymeric coatings. However, this knowledge is critical for refrigeration applications. For example, in "flash freeze" areas of food refrigeration plants, freshly prepared vegetables and meats drip water on the floor prior to freezing and creating a hazardous ice plaque.

The temperature dependence of ice adhesion on polymer coatings depends on the changing physical properties of ice and phase transitions associated with coatings. Saeki[2] and Palacios[8] reported almost linear increase in ice adhesion strength with decreasing temperature on metal substrates, but virtually nothing is known for polymer coatings. For elastomeric polymer materials, moduli change with decreasing temperature, especially when approaching the glass transition temperature. As indicated by the Kendal Equation (Eq 1.), an increase in substrate modulus results in higher adhesion strength for a rigid adherent.

In this project, preliminary results were obtained at two different temperatures, −10

TABLE 2

Solvent table for thermoplastic polyurethanes and coating systems.

Figure 14:
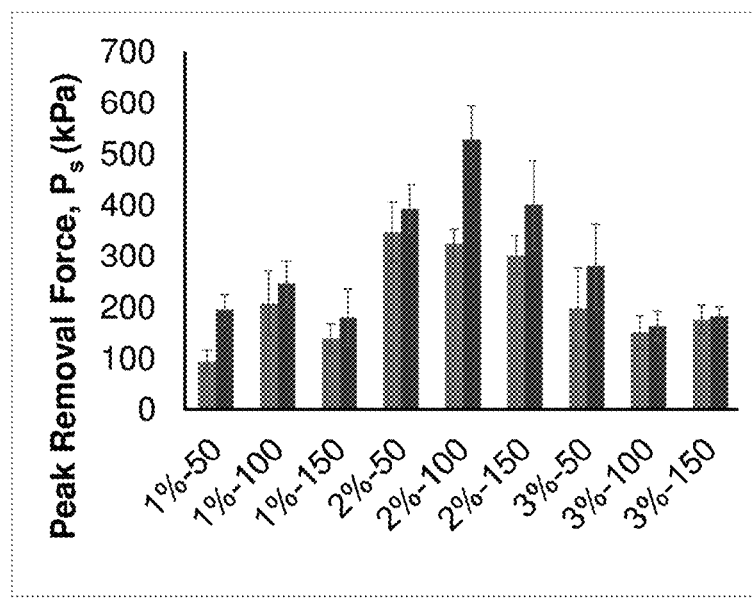
FIG. 14 shows peak removal force of PDMS modified coatings at −10° C. (left bars) and −20° C. (right bars) at three PDMS loading levels (1%, 2% and 3%) and three thicknesses (50, 100 and 150 μm).

| Solvent system | Comments |
| --- | --- |
| THF | Used ER-coat-0, ER-coat-1, ER-coat-2, excellent solvent. |
| MeTHF | Tested successfully for ER-coat-0, ER-coat-1, ER-coat-2, excellent solvent. |
| Ethanol | Cannot be used alone to dissolve ER-coat-0, ER-coat-1, ER-coat-2. A mixture containing up to 50 wt % ethanol (with THF) was used and no difference was found in coatings from those made with THF. One of the best ER-coat-2 coatings was made with this solvent system. Mixtures with MeTHF behaved the same as those with THF. |
| 2-Propanol (IPA) | Pure IPA behaved similar to ethanol. Mixtures of IPA (up to 30 wt %) and THF can be used for dissolving ER-coat-0, ER-coat-1, ER-coat-2. |
| n-Propanol | Pure n-propanol is a better solvent than IPA and ethanol for ER-coat-0, but not as good as that of THF. No further tests at this time. |
| 2-Butanol | Cannot be used along as a solvent for ER-coat-0, mixtures of 2-butanol (30 wt %) and THF were good solvents. |
| tert-Butanol | Similar to 2-butanol. |
| n-Butanol | Similar to 2-butanol. |
| Butyl acetate | Similar to n-propanol |
| Acetone | Similar but better than IPA |
| Ethyl acetate | Poor solvent for ER-coat-0. Mixtures containing 50% THF tested well. | and −20° C. FIG. 14 shows the dependence of ice adhesion strength for ER-coat-2 systems with 1-3 wt % PDMS. There is a systematic increase in ice adhesion at −20° C. compared to −10° C. for 1 and 2 wt % nanosurface modification. Interestingly, for the thicker (100 and 150 μm) coatings at 3 wt % PDMS, $P_s$ is virtually the same at both temperatures. The $T_g$ for PTMO (2 kDa) is −65° C. while that for PDMS is −110° C. Thus, the effect of $T_g$ in rigidifying the mesosurface at the lower temperature may have been modulated by the higher (3 wt %) PDMS content. In Phase II we will propose a systematic study of the temperature dependence of ice adhesion. This will be an important effort as applications such as "flash freeze" chambers noted above operate at −20° F. or −29° C. An essential part of our development plan for Phase II will be to retain <100 kPa for $P_s$ at temperatures as low as −30° C.

Work Task 2: Optimization of Ice-Release Performance

TABLE 2

DOE compositional independent variables.

| Independent variable categories | Specific material variables | | Molecular weight | Concentration/ composition |
|---|---|---|---|---|
| Nano-Surface Modifier | PDMS | Difunctional Mono-functional, di-functional | 1,000-26,000 Da | 0.5 wt %- 10 wt % |
| | Mixed Surface Modifiers | Select from above (e.g., difunctional/monofunctional PDMS) | $M_w$ distribution | 0.5 wt %- 10 wt % |
| Mesosurface | Poly(tetramethylene oxide), PTMO Polypropylene oxide, PPO Polyisobutylene, PIB | | <1,000-5,000 Da | 40-60 wt % of coating |
| Mesosurface Builder | BTESE, bis(triethoxysilyl)ethane ES40 or ES50 (poly(diethoxysiloxane) | | | 1 w %-30 wt % of mesosurface |
| Bulk | Thermoplastic polyurethane (TPU), PDMS-PU, PDMS-PUU | | >100 kDa | 60-40 wt % of coating |

Although guided by theory (FIG. 2, Scheme 1), considering many possible variations in nanosurface modifiers, mesosurface "builders", and bulk linear polyurethanes (and thickness) we were fortunate to discover ER-coat-2 (1 wt % PDMS) at 50 μm. To make rapid progress in Phase II, DOE will be performed to improve further ice-release performance.

Independent variables affecting (or that are likely to affect) peak removal force include those determining composition (Table 2) and those involving processing (Table 3).

TABLE 3

DOE processing independent variables

| Independent variable categories | Range of variations for independent variables |
|---|---|
| Solvent system | Single component solvents Concentration Solvent mixtures (Table 5) Solvent ratios Solute concentration |
| Drying conditions | Solvent evaporation rate by controlling air flow and vapor pressure Temperature |
| Curing conditions | Temperature from RT to 100° C. Time (30 min to 24 hr) |
| Coating preparation method | Drip or Dip coating Spraying Melt pressing/lamination Overcoating |

Figure 2:
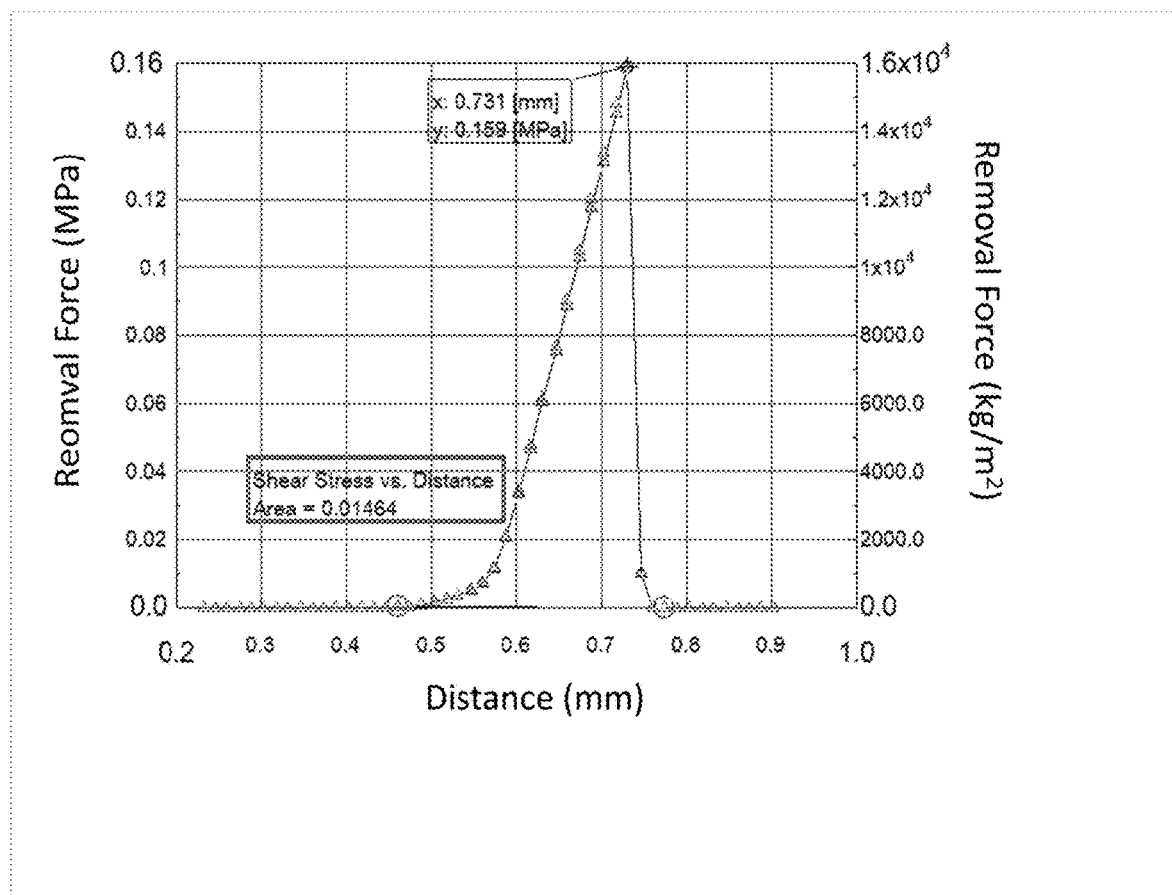
FIG. 2 presents a representative force-distance curve showing peak removal force $P_s$ for PTMO-40 50 μm thick hybrid coating (ER-coat-1).
Figure 3:
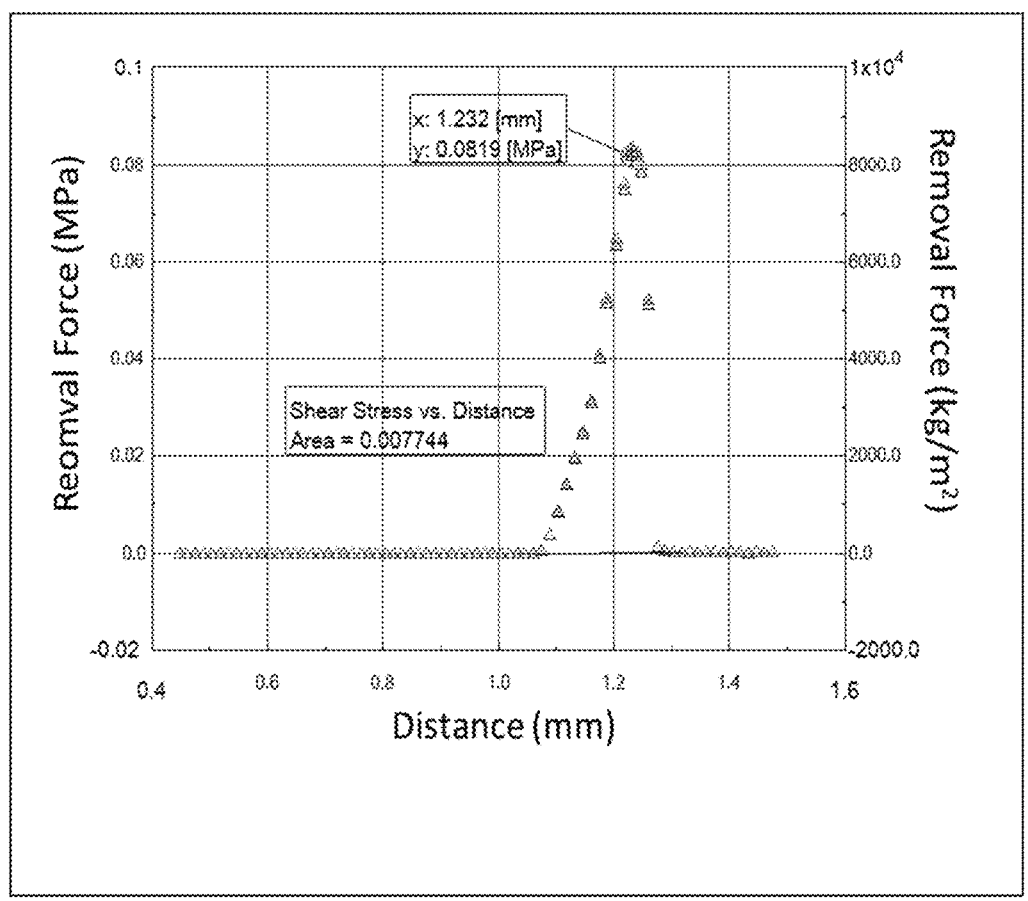
FIG. 3 presents a representative force-distance curve showing peak removal force Ps for PTMO-40 with 1 wt % PDMS 50 μm thick coating (i-Coat-2).

As suggested in FIG. 2 and Scheme 1, compositional variables that will be evaluated in Phase II include (1) the type, content and molecular weight of nanosurface modifier, (2) the type and content of mesosurface and mesosurface builder, and (3) the type, content and molecular weight of bulk polymer.

Multiple DOEs will be devised from coarse to fine variations in composition and processing based on a manageable experimental size. These variables will affect the surface chemical composition, receding contact angles, mechanical properties, and phase separation of the coating components.

Processing variables that are likely to affect the key dependent variable ($P_S$) include (1) selection of solvent system (mixture and compositions of solvent mixtures), (2) drying conditions (controlled solvent evaporation rate), (3) curing conditions (temperature and time), and (4) coating preparation method (spraying, brush or melt-pressing/laminating, overcoating multilayers). These variables are critical to coating layer stratification, mesosurface formation, concentration of surface function, and surface topology as well as assessing the optimum approach for scaleup and larger scale manufacturing.

C. Improving Low Temperature Performance.

For many applications such as commercial refrigeration discussed above, performance at temperatures lower than those typically reported for ice release tests (−10° C.) are of critical importance. FIG. 7 shows $P_S$ for ER-coat-2 with 1, 2, and 3 wt % PDMS modifier at different coating thicknesses. $P_S$ generally increases at −20° C. compared to −10° C. The least effect for the lower temperature is seen for the two thicker 3 wt % PDMS modified coatings.

The general trend of higher peak removal force at lower temperatures is readily understood with reference to the Kendall equation (Eq 1). As temperature decreases coatings become more rigid as the glass transition temperature ($T_g$) is approached. As the coating becomes more rigid (higher modulus, E) the peak removal force increases (Eq 1).

Although the prediction from Kendall theory is clear and offers a theoretical basis for preliminary results in FIG. 7, published work provides virtually no guidance as most testing is at −10° C. The pioneering research of Jellinek 35 years ago addressed temperature dependence, but results were not clearly related to polymer structure and composition.[3] Considering the importance of easy ice release at low temperatures for refrigeration, aerospace, and energy sectors, the determination of $P_S$ as a function of temperature is a priority for Phase II research and development.

An important factor in considering low temperature performance is not only the nominal glass transition temperature, but the breadth of $T_g$ and the modulus at use temperature. To illustrate, FIG. 8 shows a schematic generated from DMA data for PDMS and PTMO polyurethanes reported by Cooper.[1]

The PDMS soft block is extremely well phase separated giving a sharp $T_g$ near that for the soft block alone and a relatively flat plateau modulus. The PTMO polyurethane has a broader and higher $T_g$ resulting in a considerable change in modulus over the temperature range of interest (−10 to −30° C.). While the two red lines that define the modulus at −10 and −30° C. seem close together, the ordinate is a log scale. Like this example, the modulus doubles from −10 to −30° C. for many PTMO-based polyurethanes. This factor of two is important considering the relationship of modulus to $P_S$. While $T_g$ is available from most resin suppliers and can be used for a rough screening, data shown in FIG. 8 is not available. To rationally improve ice release performance, DMA is seen as an essential characterization method. In this proposal a DMA instrument is requested not only to perform $P_S$ measurements, but also to analyze commercially available materials for correlation with $P_s$ so as to rapidly move forward with bulk polyurethane candidates.

Work Task 3: Optimization of Low Temperature Performance

Increased modulus at lower temperatures is the principle change affecting ice adhesion (Equation 1), as to a first approximation thickness and work of adhesion remain constant. For polymer materials, modulus (stiffness) gradually increases as temperature decreases and the glass transition temperature is approached. At $T_g$ the modulus increases markedly. Therefore, this work task is designed to incorporate lowest possible $T_g$ polyurethane into ER-coat coatings.

Poly(dimethylsiloxane) networks (silicones, PDMS) are well known for low $T_g$ (−110° C.) but PDMS elastomers are particularly poor candidates for i-Mats due to poor wear resistance and poor adhesion to substrates. We will seek methods that utilize PDMS networks while retaining good mechanical properties. The first priority in this regard is a comprehensive assessment of the effect of PDMS molecular weight and weight percent on peak removal force for ER-coat-2 systems. So far, only a limited compositional range and one molecular weight (5 kDa) has been investigated (FIGS. 5 and 6). This work received first priority because of success so far with the hybrid model shown in FIG. 2 and remarkable results for ER-coat-2 (1 wt % PDMS) shown in FIG. 4.

TABLE 4

Commercially available soft blocks, glass transition temperatures, and TPU commercial availability.

| Soft Block | $T_g$, ° C. (in polymer, if known) | TPU commercial availability |
|---|---|---|
| PTMO (2000) | −60 (DMA), −77 (DSC) | Many suppliers and grades, e.g. Lubrizol Pellethane ® and Tecoflex ® TPU |
| Proprietary | −75 (DSC) | Lubrizol Estane ALR-E72A ($M_w$ ~233 kDa) |
| PPO | −35 to −50 | Many suppliers and grades, e.g. Merquinsa Pearlcoat ® 165K |

The mesosurface also requires materials with a low glass transition temperature. As illustrated in Scheme 1, mesosurface precursors are made from a difunctional polyether. Table 4 shows commercially available difunctional polyethers that can be used for polyurethane soft blocks and mesosurface precursors. It should be noted that $T_g$ also depends on soft block molecular weight. Usually, higher molecular weight results in lower $T_g$ (better phase separation) provided crystallization is absent.

In Phase II, difunctional polyethers and combinations thereof (Table 4) and commercially available low $T_g$ polyurethanes will be used to achieve low $P_S$ at low temperatures. Again, the DOE method will be used to quickly find optimum combinations.

D. Environmentally Benign Processing.

Reducing or eliminating organic solvents from coating preparation processes are goals to reduce manufacturing cost and assure a safer working environment. Tetrahydrofuran (THF) was used for coating systems in Phase I. On a small scale, THF is acceptable, but volatility, peroxide formation, and EPA/OSHA regulations result in increased manufacturing costs during scale-up partly due to solvent recovery.

An important achievement in Phase I was finding a replacement for THF, namely 2-methyltetrahydrofuran (MeTHF), which does not form peroxides. Other solvents and solvent mixtures explored are listed in Table 2 of the Phase I final report. Optimizing and reducing solvent use will be the subject of continuous study in Phase II so as to reduce cost and optimize performance.

The i-Mat product does not involve solvent exposure for commercial freezer applications in food processing. Also, i-Mats can be installed without disrupting normal operations. As noted above, Phase II development will emphasize development of ER-coat films such as ER-coat-2 (1% PDMS), 50 μm, that can be thermally bonded to substrates. This is an exciting option as:

(1) Solvent used for ER-coat film formation can be recycled as is presently done during drying/cure by passing air through a cold trap (2) The resulting ER-coat film that will be used for thermal bonding will be formed on a reusable release surface their boiling points (3) The released film depicted in FIG. 2 is well suited to thermal bonding as the bulk is a thermoplastic polyurethane, while the hybrid functional nanosurface and mesosurface are crosslinked and thermally insensitive.

TABLE 5

Solvent candidates and their boiling points

| Solvent candidates | Boiling Point (° C.) |
|---|---|
| THF | 66 |
| MeTHF | 80 |
| Ethanol | 78 |
| 2-Propanol (IPA) | 83 |
| n-Propanol | 97 |
| 2-Butanol | 100 |
| tert-Butanol | 82 |
| n-Butanol | 117 |
| Butyl acetate | 126 |
| Acetone | 56 |
| Ethyl acetate | 77 |

Work Task 4: Development of Environmentally Benign Processing

Limited work on solvent mixtures was carried out in Phase I with an eye to controlling the surface morphology (FIG. 2) and topology (roughness) by adjusting solvent evaporation rates. In Phase II, hazardous solvent reduction will be based on (1) solvent system selection based on the principle of introducing less hazardous systems that facilitate the coating preparation process and lower processing cost and (2) in-house manufacturing of ER-coat films for thermal bonding, where solvents will be recovered during cure and film formation.

Candidates to be explored in Phase II are in connection with DOE on coating compositions and processing conditions. Table 5 lists organic solvents explored in Phase I. Except for THF and MeTHF, these solvents cannot be used alone because of poor polyurethane solubility. However, some solvent mixtures with THF and/or MeTHF were good for U-233 kDa and may facilitate the nanosurface/mesosurface morphology favoring ice release (FIG. 2, Scheme 1). Other polyurethanes to be studied under Work Task 3 may have different solubility parameters and that require selection of different solvent systems.

"Solventless" systems are widely employed in polyurethane coatings. In addition to physical crosslinking (H-bonding) such systems involve covalent bond formation (chemical crosslinking) to enhance strength and toughness. If stratification can be retained (FIG. 2) economical solventless coatings are attractive for applications such as in-service coating of wind turbine blades and electrical wires. Overcoating seems to be the only practical process, whereby a first coat is a standard thermosetting polyurethane followed by a top coat (ER-coat). Good bonding is required so overcoating will be done prior to complete thermoset cure. Polyurethane and polyurea based systems will be first choices. Such coating systems are readily available. Table 6 lists selected candidates for this work task. Possible pitfalls for such systems are the presence of unknown additives and impurities in these industrial grade systems that could jeopardize the benefit of nanosurface modification.

TABLE 6

Solventless system candidates

| Supplier | Product # or Trade name |
|---|---|
| Two-Component Systems | |
| Bayer | Baytec ME-120, ME-230 |
| Mearthane | Durethane ™ S DS-360A, 350A, 340A, 330A |
| Polyol/Polyisocyanante Components | |
| Invista | Tetrathane ® PTMO polyol |
| BASF | Lupranol ® and Pluracol ® polyether polyols |
| | Lupranate ® isocyanantes |
| Bayer | Desmodur ® isocyanates Arcol ® polyether polyol |

ER-Coat Example

A hybrid stock solution of 5 grams containing 25% solid content (1.25 gram) was first prepared. In a plastic bottle, 0.42 grams (1.68 mmole) poly(tetramethylene oxide) diol (250 grams/mole, PTMO), 0.83 grams (3.36 mmoles) of 3-isocyanatopropyltriethoxysilane (ICPES), 0.01 gram of dibutyltin dilaurate (DBTDL, or T-12) catalyst solution (10 wt % in THF), and 3.75 gram THF was added. The HDPE plastic bottle was sealed after as much air as possible was removed. The bottle was then placed in a 60° C. oven for four hours. The PTMO hybrid stock solution was then removed from the oven and used for next step or placed in the refrigerator.

Prior to creating the composition, other necessary stock solutions were made. A 10 wt % poly(diethoxysiloxane) (PDEOS) (unit MW 134.20 grams/mole) stock solution was prepared by adding 1.00 g of PDEOS to 9.00 grams of THF. A 2 wt % stock solution of silanol-terminated polydimethylsiloxane (PDMS) was prepared by adding 2.01 g of PDMS (Mn 4200 daltons) to 98.07 g of THF. The stock solution of thermoplastic polyurethane (purified Lubrizol Estane® ALR E72A, TPU) in THF was determined to be 16.99 wt %.

3.33 grams of 16.99% solid TPU stock solution (0.57 grams solid TPU) was added to 1.51 grams of 25% solid PTMO hybrid stock solution (0.38 grams solid). 0.05 grams of ES40 was present in the 0.47 grams of the 10% ES40 stock solution; this was also added to the solution of stock TPU and PTMO hybrid. PDMS was added so that it's weight was 1% of the combined weight of the solid TPU and PTMO hybrid. This was calculated to be 0.01 grams of solid PDMS. 0.01 grams of solid PDMS was added to the solution by adding 0.47 grams of the 2% PDMS stock solution. To achieve a solution with 7.5 wt % solid, a percentage for coating a microscope glass slide with about 1.25 grams of solution to achieve a coating of approximately 50 micons, 7.51 grams of extra THF was added to the solution.

Four glass microscope slides (1"×3") were labeled and coated each with 1.25 grams of solution in a glove bag. The slides were partially covered to slow the evaporation rate of the solvent thus creating a smoother surface. The slides were left in a glove bag overnight. The next morning, the slides were moved from the glove bag to the 60° C. oven. The slides were removed from the oven after overnight drying and curing. Each glass slides were cut into three 1"×1" squares so that a total 12 1"×1" slides were available for ice release test and retest after one week. The coatings averaged a peak removal force of approximately 19.4 kPa and a standard deviation of 8.4 kPa with total 24 measurements.

The entire contents of international applications PCT/US12/48425, filed Jul. 26, 2012, and PCT/US13/57874, filed Sep. 3, 2013, and U.S. application Ser. No. 13/665,915, filed Oct. 31, 2012, are hereby incorporated by reference.

What is claimed is:
1. A composition, comprising a reaction product of:
(A) one or more compounds having the following formula (I);
(B) one or more alkoxysilane, alkoxysiloxane, or combination thereof as mesosurface builder;
(C) one or more polydialkylsiloxane diol as first nanosurface modifier;
(D) optionally, one or more fluorinated alkoxysilane as second nanosurface modifier;
(E) optionally, one or more of a catalyst, water, or combination thereof;
(F) optionally, one or more solvent; and
(G) optionally, one or more thermoplastic polyurethane;
wherein formula (I) is:

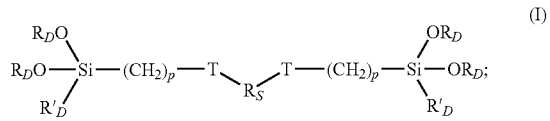

wherein $R_s$ is a soft block polymer;
wherein each T is independently a urethane or urea linkage;

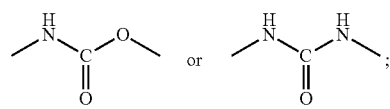

wherein each $R_D$ is independently —$CH_3$, —$CH_2CH_3$, —$CH_2CH_2CH_3$, or —$CH_2CH_2CH_2CH_3$;
wherein each $R'_D$ is independently —$CH_3$, —$CH_2CH_3$, —$CH_2CH_2CH_3$, —$CH_2CH_2CH_2CH_3$, or —$OR_D$;
wherein each p is independently 1, 2, or 3;
wherein the soft block polymer $R_s$ is not a polyoxetane; and wherein the soft block polymer $R_s$ is a polyether, polydiene, polyolefin, polysiloxane, polyester, or combination thereof; and wherein (C) is present in an amount of about 0.004-20 wt % based on the weight of the composition.

2. The composition of claim 1, wherein the soft block polymer $R_s$ is a linear homopolymer or copolymer.

3. The composition of claim 1, wherein each $R'_D$ is independently —$CH_3$, —$OCH_3$, or —$OCH_2CH_3$.

4. The composition of claim 1, comprising two or more different compounds of formula (I), wherein a first soft block polymer $R_s$ in one compound having formula (I) has a molecular weight, $M_w$, of 200-1,000 Da, and a second soft block polymer $R_s$ in a different compound having formula (I) has a molecular weight, $M_w$, of 1,500-3,000 Da.

5. The composition of claim 1, wherein mesosurface builder (B) is one or more of poly(diethoxysiloxane) (PDEOS), poly(dimethoxysiloxane) (PDMOS), 1,2-bis(triethoxysilyl)ethane (BTESE), 1,4-bis(triethoxysilyl)benzene 1,2-bis(triethoxysilyl)ethylene, bis(triethoxysilyl)methane, 1,8-bis(triethoxysilyl)octane, 1,10-bis(trimethoxysilyl)decane, 1,6-bis(trimethoxysilyl)-2,5-dimethylhexane, 1,2-bis(trimethoxysilyl)ethane, bis(trimethoxysilylethyl)benzene, 1,6-bis(trimethoxysilyl)hexane, 1,4-bis(trimethoxysilylmethyl)benzene, 1,8-bis(trimethoxysilyl)octane, or combination thereof.

6. The composition of claim 1, wherein the first nanosurface modifier (C) is polydimethylsiloxane diol, polydiethylsiloxane diol, or combination thereof.

7. The composition of claim 1, wherein the second nanosurface modifier (D) is poly[methyl(3,3,3-trifluoropropyl)siloxane] diol, pentafluorophenyltrimethoxysilane, 3-(heptafluoroisopropoxy)propyltrimethoxysilane, nonafluorohexyltriethoxysilane, nonafluorohexyltrimethoxysilane, pentafluorophenylpropyltrimethoxysilane, pentafluorophenyltriethoxysilane, bis(pentafluorophenyl)dimethoxysilane, (tridecafluoro-1,1,2,2-tetrahydrooctyl)triethoxysilane, (tridecafluoro-1,1,2,2-tetrahydrooctyl)trimethoxysilane, p-trifluoromethyltetrafluorophenyltriethoxysilane, (3,3,3-trifluoropropyl)methyldimethoxysilane, (3,3,3-trifluoropropyl)trimethoxysilane, or combination thereof.

8. The composition of claim 1, which is optically transparent.

9. The composition of claim 1, wherein (D) is present in an amount of about 0.004-20 wt % based on the weight of the composition.

10. A surface coating, comprising the composition of claim 1.

11. An article, having a surface in contact with the composition of claim 1.

12. A composition, comprising a mixture of:
the composition of claim 1; and
one or more thermoplastic polyurethane.

13. The composition of claim 12, wherein the thermoplastic polyurethane is a copolymer comprising one or more polyurethane and/or polyurethane urea segments and one or more polyether segment, polydiene segment, polyolefin segment, polysiloxane segment, polyester segment, or combination thereof.

14. The composition of claim 12, wherein the mixture comprises:
20-80 wt % of the composition of claims 1; and
80-20 wt % of the thermoplastic polyurethane.

15. The composition of claim 12, wherein the mixture is optically transparent.

16. A surface coating, comprising the composition of claim 12.

17. An article, having a surface in contact with the composition of claim 12.

18. The article of claim 11, which is a mat, tile, polyurethane, vinyl strip, or a combination thereof.

* * * * *